(12) United States Patent
Murali et al.

(10) Patent No.: US 10,311,648 B2
(45) Date of Patent: Jun. 4, 2019

(54) SYSTEMS AND METHODS FOR SCANNING THREE-DIMENSIONAL OBJECTS

(71) Applicant: AQUIFI, INC., Palo Alto, CA (US)

(72) Inventors: Giridhar Murali, Sunnyvale, CA (US); Keith Blackstone, Pacifica, CA (US); Francesco Peruch, Sunnyvale, CA (US); Carlo Dal Mutto, Sunnyvale, CA (US)

(73) Assignee: AQUIFI, INC., Palo Alto, CA (US)

( * ) Notice: Subject to any disclaimer, the term of this patent is extended or adjusted under 35 U.S.C. 154(b) by 8 days.

(21) Appl. No.: 15/630,715

(22) Filed: Jun. 22, 2017

(65) Prior Publication Data

US 2017/0372527 A1 Dec. 28, 2017

Related U.S. Application Data

(60) Provisional application No. 62/353,491, filed on Jun. 22, 2016, provisional application No. 62/472,543, (Continued)

(51) Int. Cl.
*G06T 19/20* (2011.01)
*G01S 17/00* (2006.01)
(Continued)

(52) U.S. Cl.
CPC .............. *G06T 19/20* (2013.01); *G01S 17/00* (2013.01); *G06F 3/048* (2013.01); *G06T 7/337* (2017.01);
(Continued)

(58) Field of Classification Search
None
See application file for complete search history.

(56) References Cited

U.S. PATENT DOCUMENTS

2011/0196661 A1* 8/2011 Spicola .................. A01K 29/00
703/11
2011/0267344 A1* 11/2011 Germann ........... G06K 9/00201
345/420

(Continued)

OTHER PUBLICATIONS

Besl et al., "A Method for Registration of 3-D Shapes," IEEE Transactions on Pattern Analysis and Machine Intelligence, vol. 14, No. 2, Feb. 1992 (pp. 239-256).

(Continued)

*Primary Examiner* — Nurun N Flora
(74) *Attorney, Agent, or Firm* — Lewis Roca Rothgerber Christie LLP

(57) ABSTRACT

A method for computing a three-dimensional (3D) model of an object includes: receiving, by a processor, a first chunk including a 3D model of a first portion of the object, the first chunk being generated from a plurality of depth images of the first portion of the object; receiving, by the processor, a second chunk including a 3D model of a second portion the object, the second chunk being generated from a plurality of depth images of the second portion of the object; computing, by the processor, a registration of the first chunk with the second chunk, the registration corresponding to a transformation aligning corresponding portions of the first and second chunks; aligning, by the processor, the first chunk with the second chunk in accordance with the registration; and outputting, by the processor, a 3D model corresponding to the first chunk merged with the second chunk.

29 Claims, 15 Drawing Sheets

(8 of 15 Drawing Sheet(s) Filed in Color)

Related U.S. Application Data filed on Mar. 16, 2017, provisional application No. 62/520,353, filed on Jun. 15, 2017.

(51) Int. Cl.

| | | |
|---|---|---|
| *G06F 3/048* | (2013.01) | |
| *G06T 17/00* | (2006.01) | |
| *H04N 13/00* | (2018.01) | |
| *G06F 3/0484* | (2013.01) | |
| *G06F 3/01* | (2006.01) | |
| *G06T 7/38* | (2017.01) | |
| *G06T 7/33* | (2017.01) | |
| *G06T 19/00* | (2011.01) | |
| *H04N 13/282* | (2018.01) | |
| *H04N 13/296* | (2018.01) | |
| *H04N 13/254* | (2018.01) | |
| *H04N 13/271* | (2018.01) | |
| *H04N 13/239* | (2018.01) | |
| *G06F 3/0488* | (2013.01) | |
| *G06F 3/0481* | (2013.01) | |

(52) U.S. Cl.
CPC ............... *G06T 7/38* (2017.01); *G06T 17/00* (2013.01); *G06T 19/006* (2013.01); *H04N 13/239* (2018.05); *H04N 13/254* (2018.05); *H04N 13/271* (2018.05); *H04N 13/282* (2018.05); *H04N 13/296* (2018.05); *G06F 3/017* (2013.01); *G06F 3/04815* (2013.01); *G06F 3/04845* (2013.01); *G06F 3/04883* (2013.01); *G06T 2200/08* (2013.01); *G06T 2200/24* (2013.01); *G06T 2207/10028* (2013.01); *G06T 2207/20221* (2013.01); *G06T 2219/2004* (2013.01); *G06T 2219/2012* (2013.01); *G06T 2219/2016* (2013.01); *H04N 2013/0081* (2013.01)

(56) References Cited

U.S. PATENT DOCUMENTS

| | | | | |
|---|---|---|---|---|
| 2013/0286012 | A1* | 10/2013 | Medioni | G06T 17/00 345/420 |
| 2014/0253546 | A1* | 9/2014 | Hickman | G09G 5/00 345/419 |
| 2015/0261184 | A1* | 9/2015 | Mannion | G06T 17/00 348/41 |
| 2016/0071318 | A1* | 3/2016 | Lee | G06T 17/00 345/419 |
| 2016/0189426 | A1* | 6/2016 | Thomas | G06T 19/006 345/633 |
| 2016/0189433 | A1* | 6/2016 | Dayde | G06T 19/20 345/419 |

OTHER PUBLICATIONS

Szeliski, Richard. *Computer vision: algorithms and applications.* Springer Science & Business Media, 2010, pp. 181-210.

Yang, Jiaolong, Hongdong Li, and Yunde Jia. "Go-icp: Solving 3d registration efficiently and globally optimally." *Proceedings of the IEEE International Conference on Computer Vision.* 2013, pp. 1457-1464.

* cited by examiner

SYSTEMS AND METHODS FOR SCANNING THREE-DIMENSIONAL OBJECTS

CROSS-REFERENCE TO RELATED APPLICATION(S)

This application claims the benefit of U.S. Provisional Patent Application No. 62/353,491, filed in the United States Patent and Trademark Office on Jun. 22, 2016, U.S. Provisional Patent Application No. 62/472,543, filed in the United States Patent and Trademark Office on Mar. 16, 2017, and U.S. Provisional Patent Application No. 62/520,353, filed in the United States Patent and Trademark Office on Jun. 15, 2017 the entire disclosures of which are incorporated by reference herein.

FIELD

Aspects of embodiments of the present invention relate to the fields of image capture systems, image processing, three-dimensional (3D) scanning, and associated user interface systems.

BACKGROUND

Aspects of embodiments of the present invention relate to the field of three-dimensional (3D) scanning. In this process, a camera collects data from different views of an ordinary object, then aligns and combines the collected data (e.g., separate images of different sides of the object) to create a 3D model of the shape and color (if available) of the object. The 3D model may include a representation of the shape of an object, such as vertices, edges, textures, and color. The term "mapping" is also sometimes used to reflect the process of capturing a space or, more generally, a scene in three-dimensions.

Generating 3D models in this way presents the particular challenge that substantially all of the sides of the object or portion of the scene need to be imaged in order to produce a complete model of the object. For example, it may be difficult or impossible to produce an accurate model of portions of a subject (e.g., an object or a scene) that are not captured during the 3D scanning process. In addition, failing to capture images of the object from some certain angles may result in holes, gaps, distortions, or other artifacts in the generated model (in some instances, the bottom surface of the object may be ignored if it is not relevant to the desired 3D model). While it may be possible to reconfigure the object and/or the camera to make it possible to view these hidden areas, it may be computationally difficult or infeasible to combine, automatically, the data collected in the first configuration with the data collected in the second configuration.

To cover sufficient color and geometric aspects of an object, the scanning process may capture hundreds of frames of the relevant portion of the scene. The amount of data that is produced and the processing time of the data can be very high, and identifying common features in the images across this large data set for determining the relationship of the images to one another can be computationally intensive.

SUMMARY

Aspects of embodiments of the present invention relate to three-dimensional (3D) scanning of objects where occlusions and visibility constraints pose a challenge in obtaining a complete 3D scan of all of the exterior surfaces of the object.

According to one embodiment of the present invention, a method for computing a three-dimensional (3D) model of an object includes: receiving, by a processor, a first chunk including a 3D model of a first portion of the object, the first chunk being generated from a plurality of depth images of the first portion of the object; receiving, by the processor, a second chunk including a 3D model of a second portion the object, the second chunk being generated from a plurality of depth images of the second portion of the object; computing, by the processor, a registration of the first chunk with the second chunk, the registration corresponding to a transformation aligning corresponding portions of the first and second chunks; aligning, by the processor, the first chunk with the second chunk in accordance with the registration; and outputting, by the processor, a 3D model corresponding to the first chunk merged with the second chunk.

The computing the registration of the first chunk with the second chunk may include: computing a first cuboid bounding box of the first chunk; computing a second cuboid bounding box of the second chunk; finding a plurality of rigid transformations of the first cuboid onto the second cuboid; computing a plurality of registration costs, each of the registration costs corresponding to one of the rigid transformations; and selecting a rigid transformation of the rigid transformation in accordance with the registration costs, the registration including the rigid transformation.

The computing the registration of the first chunk with the second chunk may include: extracting, by the processor, first key points from the first chunk; extracting, by the processor, second key points from the second chunk; and computing a rigid transformation from the second key points to the first key points.

The method may further include: computing a registration cost of the rigid transformation; modifying the registration cost in accordance with inconsistency between matching points of the first chunk and the second chunk; and computing the registration in accordance with a rigid transformation having a minimized registration cost.

The computing the registration of the first chunk with the second chunk may include: receiving a user supplied transformation of the first chunk, the user supplied transformation; and applying the user supplied transformation to the first chunk.

The computing the registration of the first chunk with the second chunk may further include: computing a first cuboid bounding box of the first chunk; computing a second cuboid bounding box of the second chunk; identifying three vertices of the first chunk; transforming the three vertices of the first cuboid in accordance with the user supplied transformation; identifying the three vertices of the second cuboid corresponding to the transformed three vertices of the first cuboid; computing a vertex transformation of the three vertices of the first cuboid to the three corresponding vertices of the second cuboid; initializing the transformation aligning corresponding portions of the first and second chunks in accordance with the user supplied transformation and the vertex transformation; and refining the transformation aligning corresponding portions of the first and second chunks in accordance with a local registration method.

The aligning the first chunk with the second chunk in accordance with the registration may include: transforming the first chunk in accordance with the registration; combining matching points between the first chunk and the second chunk; and adding unique points from the first chunk and the second chunk.

The method may further include: when the registration of the first chunk with the second chunk fails: receiving an additional depth frame corresponding to the second chunk; updating the 3D model of the second chunk in accordance with the additional depth frame to compute an updated second chunk; and computing the registration of the first chunk with the updated second chunk.

The 3D model of the first portion of the object may correspond to the object in a first configuration, and the 3D model of the second portion of the object corresponds to the object in a second configuration.

The method may further include: detecting portions of the depth images of the second portion of the object corresponding to human hands; removing the portions of the depth images corresponding to the human hands; and generating the second chunk from the depth images with the portions corresponding to human hands removed from the depth images.

According to one embodiment of the present invention, a system for generating a three-dimensional (3D) scan of an object includes: a depth camera system including a sensor; a display device; a processor coupled to depth camera system and the display device; and memory storing instructions that, when executed by the processor, cause the processor to: control the depth camera system to capture a first plurality of depth images; compute a first chunk including a 3D model of a first portion of the object generated from the first plurality of depth images; control the depth camera system to capture a second plurality of depth images; compute a second chunk including a 3D model of a second portion of the object generated from the second plurality of depth images; compute a registration of the first chunk with the second chunk, the registration corresponding to a transformation aligning corresponding portions of the first and second chunks; align the first chunk with the second chunk in accordance with the registration; and display, on the display device, a 3D model corresponding to the first chunk merged with the second chunk.

The memory may further store instructions that, when executed by the processor, cause the processor to compute the registration of the first chunk with the second chunk by: computing, by the processor, a first cuboid bounding box of the first chunk; computing, by the processor, a second cuboid bounding box of the second chunk; finding, by the processor, a plurality of rigid transformations of the first cuboid onto the second cuboid; computing, by the processor, a plurality of registration costs, each of the registration costs corresponding to one of the rigid transformations; and selecting, by the processor, a rigid transformation of the rigid transformation in accordance with the registration costs, the registration including the rigid transformation.

The memory may further store instructions that, when executed by the processor, cause the processor to compute the registration of the first chunk with the second chunk by: extracting, by the processor, first key points from the first chunk; extracting, by the processor, second key points from the second chunk; and computing a rigid transformation from the second key points to the first key points.

The memory may further store instructions that, when executed by the processor, cause the processor to compute the registration of the first chunk with the second chunk by: computing a registration cost of the rigid transformation; modifying the registration cost in accordance with inconsistency between matching points of the first chunk and the second chunk; and computing the registration in accordance with a rigid transformation having a minimized registration cost.

The memory may further store instructions that, when executed by the processor, cause the processor to: receive a user supplied transformation of the first chunk, the user supplied transformation; and apply the user supplied transformation to the first chunk.

The display device may be a touchscreen, and the user supplied transformation may be received via a touch input supplied to the touchscreen.

The user supplied transformation may be detected as a three dimensional gesture detected by the depth camera system.

The memory may further store instructions that, when executed by the processor, cause the processor to compute the registration of the first chunk with the second chunk by: computing a first cuboid bounding box of the first chunk; computing a second cuboid bounding box of the second chunk; identifying three vertices of the first chunk; transforming the three vertices of the first cuboid in accordance with the user supplied transformation; identifying the three vertices of the second cuboid corresponding to the transformed three vertices of the first cuboid; computing a vertex transformation of the three vertices of the first cuboid to the three corresponding vertices of the second cuboid; initializing the transformation aligning corresponding portions of the first and second chunks in accordance with the user supplied transformation and the vertex transformation; and refining the transformation aligning corresponding portions of the first and second chunks in accordance with a local registration method.

The memory may further store instructions that, when executed by the processor, cause the processor to align the first chunk with the second chunk by: transforming the first chunk in accordance with the registration; combining matching points between the first chunk and the second chunk; and adding unique points from the first chunk and the second chunk.

The memory may further store instructions that, when executed by the processor, cause the processor to, when the registration of the first chunk with the second chunk fails: receive an additional depth frame corresponding to the second chunk; update the 3D model of the second chunk in accordance with the additional depth frame to compute an updated second chunk; and compute the registration of the first chunk with the updated second chunk.

The 3D model of the first portion of the object may correspond to the object in a first configuration, and the 3D model of the second portion of the object may correspond to the object in a second configuration.

The memory may further store instructions that, when executed by the processor, cause the processor to: detect portions of the depth images of the second portion of the object corresponding to human hands; remove the portions of the depth images corresponding to the human hands; and generate the second chunk from the depth images with the portions corresponding to human hands removed from the depth images.

The display device may be integrated into a pair of augmented reality glasses.

The depth camera system may be integrated into the pair of augmented reality glasses.

According to one embodiment of the present invention, a method for assembling a plurality of chunks corresponding to separate three-dimensional (3D) models of different portions of an object, the chunks being displayed in a graphical user interface, includes: receiving, by a processor, a selection of a first chunk of the plurality of chunks, the first chunk including a 3D model of a first portion of the object; receiving, by the processor, a selection of a second chunk of the plurality of chunks, the second chunk including a 3D model of a second portion of the object; computing, by the processor, a registration of the first chunk with the second chunk, the registration corresponding to a transformation aligning corresponding portions of the first and second chunks; aligning, by the processor, the first chunk with the second chunk in accordance with the registration; and displaying, by the processor, the first chunk assembled with the second chunk as a chunk assembly.

The method may further include: receiving user input to transform a view of the chunk assembly, the user input including at least one transformation of the group including: a rotation; a translation; and a zoom.

The method may further include: receiving a user input to transform the first chunk, the user input including at least one transformation of the group including a rotation and a translation; and updating the displaying of the first chunk in accordance with the user input.

The method may further include displaying a confidence of the chunk assembly.

Points in the chunk assembly may be colored in accordance with whether the points originated from the first chunk or the second chunk.

The plurality of chunks may be associated with a scanning project, the scanning project including one or more versions of assemblies of one or more chunks, each version being associated with metadata storing a collection of chunks that are included an assembly associated with the version.

At least one chunk of the plurality of chunks may be received from a remote source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1B:
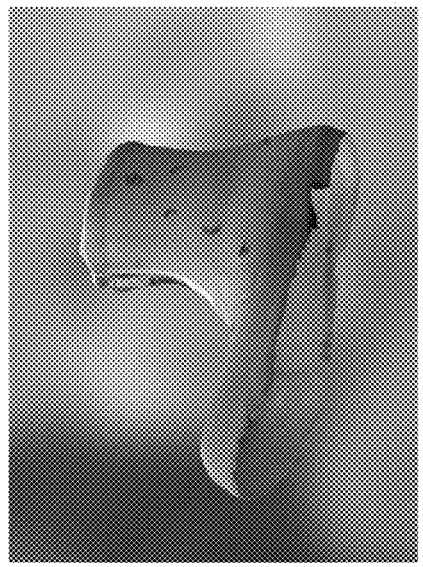
FIG. 1B is an example of a three dimensional (3D) model of the object shown in FIG. 1A, generated by performing a scan of the object in the configuration shown in FIG. 1A.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

It will be understood that, although the terms "first," "second," "third," etc., may be used herein to describe various elements, components, regions, and the like (e.g., first and second configurations, and/or first and second chunks), these elements, components, regions, and the like should not be limited by these terms. These terms are used to distinguish one element, component, region, and the like from another element, component, region, and the like, and are not intended to indicate a particular ordering of the elements, components, regions, or the like. Thus, a first element, component, region, or the like described below could be termed a second element, component, region, or the like, without departing from the spirit and scope of the present invention.

A depth camera captures depth images of scenes to generate three-dimensional models of those scenes. A depth image (or depth frame or depth data) refers to an image where each pixel encodes a distance value (e.g., a distance from the camera), and may also encode other information, such as color data. A three-dimensional model captured in this way may be represented as a "point cloud," which is a collection of labeled points in a three-dimensional space (e.g., each labeled point having x, y, and z coordinates with respect to a reference 3D coordinate system) which loosely correspond to the surface of a scene (e.g., an object). The points in the point cloud may or may not encode color information. An example of a 3D point cloud format is a Wavefront .obj or .ply.

Figure 1A:
FIG. 1A is a photograph of an object, in this example a boot, in one configuration where the boot is resting on its sole.

At any point in time, a depth camera can only capture information about the surfaces of the scene that are currently visible to the depth camera. Some portions of the scene or objects may be hidden (or occluded) by other surfaces in the scene. For example, capturing a depth image of one side of a boot (see, e.g., the photograph of a boot in FIG. 1A) would not provide any information about the shape of the surface of the opposite side of the boot. By moving the camera around the object, it may be possible for the camera to capture, continuously (e.g., at a high frame rate, such as 30 frames per second), views of the object from additional angles, such as imaging the opposite side of the boot. This continuous capture of views of a scene or object from multiple angles will be referred to herein as a scan of the scene or object. FIG. 1B is an example of a three dimensional model generated from a scan of the boot depicted in FIG. 1A. During this scan, the camera was moved around the boot to capture the various sides, while the boot remained stationary on the table.

In general, it is impossible to image all of the exterior surfaces of an object by moving only the camera, at least because the object typically rests on an opaque platform. In the example shown in FIG. 1A, the boot is standing on an opaque table, and the sole of the boot is hidden from view because it is facing, and in contact with, the table. Therefore, while the sides of the boot (for example, the lateral and medial sides, the vamp, and the quarter) are captured, the sole of the boot is occluded by the table and not captured. As a result, the 3D model shown in FIG. 1B does not include the bottom surface or sole of the boot, as depicted by the hole or gap in the model.

Figure 1C:
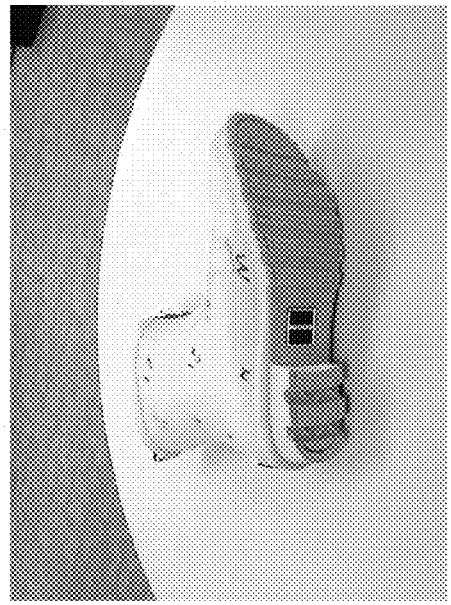
FIG. 1C is a photograph of the boot of FIG. 1A in a different configuration where the boot is rotated to rest on its side.

For this reason, after capturing images of the surfaces that are visible when the object is in a first configuration (e.g., with the boot standing on its sole), the object may need to be reconfigured (e.g., re-positioned, such as rotating or translating the boot) one or more times in order to expose the surfaces that are occluded in that first configuration. FIG. 1C is a photograph showing the same boot of FIG. 1A, reconfigured such that the boot is resting on its lateral side (e.g., so that the lateral side faces the table), making the sole of the boot visible to the camera. With the target object thus reconfigured, the user may perform another scan and acquire views of the newly visible surface (e.g., images of the sole of the boot), as well as overlapping images of already captured regions of the object (e.g., the medial side of the boot). This operation may be repeated to generate multiple scans of the same object to capture more of the exterior surfaces of the object (e.g., to capture all or substantially all of the visible surfaces in at least one of the scans). Generally, outwardly facing surfaces of the object (such as the sole, the lateral and medial sides, and the vamp of the boot) will be captured during a scan. In addition, some inwardly facing surfaces of the object that are visible through an opening of the object (such as the collar lining at the entrance of the boot, or the portion of the insole near the heel) may also be captured in one or more scans, while other inwardly facing surfaces (such as portions of the insole near the toes or the vamp lining near the toes) may not be captured during a scan. For the sake of convenience, the exterior surfaces will be used to refer to the set of points that lie on the surface of the object that are visible from at least one vantage point in the space around the object (e.g., that can be practically captured by a scanning device moving around the outside of an object).

Each of these scans includes one or more depth images, which may be represented as point clouds. Assuming depth images are captured at a high frame rate, each of the scans may include hundreds or thousands of point clouds.

Standard techniques for aligning and merging point clouds (as obtained by a moving depth camera, or a depth camera capturing images from multiple angles) assume that there is substantial spatial overlap between the surface portions seen by the camera during acquisition of two consecutive depth images, and that an initial approximate alignment of the acquired point clouds is available, where each point cloud is defined with respect to a reference frame attached to the camera. The first assumption increases the likelihood of obtaining a robust alignment, and the second assumption increases the likelihood that the algorithm will converge to the correct alignment using standard iterative algorithms such as Iterative Closest Point (ICP) (see, e.g., Besl, Paul J., and Neil D. McKay. "Method for registration of 3-D shapes." Robotics-DL tentative. International Society for Optics and Photonics, 1992).

These assumptions may hold when the object is not reconfigured from depth image to the next, and when the camera has moved only a relatively short distance between capturing the depth images that are to be aligned and merged, because much of the object will appear to the same when the change in viewpoint is small (e.g., a rigid transformation from one point cloud to the next may require only a local transformation, e.g., small rotation and/or a small translation). As a result, consecutive point clouds acquired by a moving depth camera during a scan may satisfy the above assumptions of high overlap and initial approximate alignment, so long as the object does not significantly move during the scan.

However, these assumptions generally will not hold if the camera moves a large distance (e.g., to the opposite side of the object) or if the object is reconfigured (e.g., flipped over) between the depth images to be merged, because the corresponding point clouds will have grossly different alignments (e.g., the frame of reference may be completely different).

While there exist algorithms that are able to align point clouds even when starting from a grossly incorrect initial alignment (see e.g., Yang, Jiaolong, Hongdong Li, and Yunde Jia. "Go-ICP: Solving 3D Registration Efficiently and Globally Optimally." Proceedings of the IEEE International Conference on Computer Vision. 2013), these techniques are typically computationally very expensive (on the order of tens of seconds on current hardware for aligning two moderately sized sets of points). This is because finding a global transformation generally involves searching for the best transformation that minimizes a cost function over the space of all possible transformations, rather than only needing to search a small, local space of small transformations, as would be the case when the point clouds have a similar alignment. (If a very reliable initial approximate alignment can be obtained, the first assumption of substantial overlap can be somewhat relaxed, as in this case even a small surface overlap can lead to successful alignment refinement.) Examples of cost functions are the root mean square error (RMSE), the percentage of overlap between the two point clouds, the match of colors or surface normals (e.g., shape) of the point clouds, or a combination of cost functions.

Figure 2B:
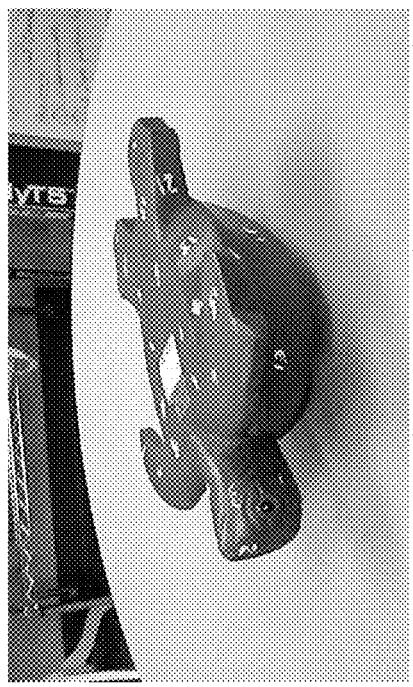
FIGS. 2A and 2B are photographs of a sculpture of a sea turtle in configurations with its ventral side down and ventral side up, respectively.
Figure 2D:
FIGS. 2C and 2D are images of 3D models generated of the sculpture in the ventral side down and ventral side up configurations shown in FIGS. 2A and 2B, respectively.
Figure 2A:
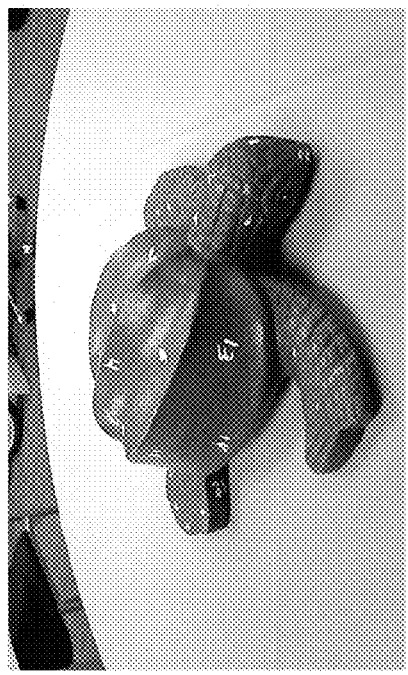
Figure 2C:
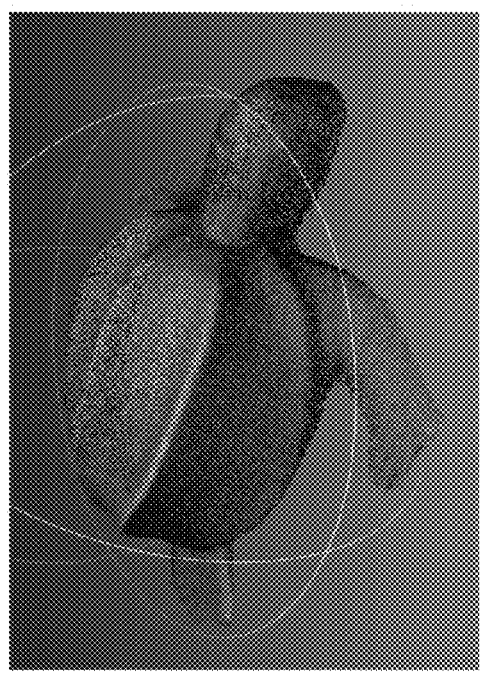

Some types of objects may have shapes that are unsuited to reconfiguration in a way that results in large amounts of overlap, which may further frustrate a global search technique. FIGS. 2A and 2B are photographs of a sculpture of a sea turtle in configurations with its ventral side down and ventral side up, respectively. FIGS. 2C and 2D are images of the 3D models (or chunks) generated from scans of the sculpture in the ventral side down and ventral side up configurations shown in FIGS. 2A and 2B, respectively. Due to the shape of the sculpture, other configurations are difficult or impractical to achieve. For example, it would be difficult to orient the sculpture such that it rested on its edge (e.g., rotated on edge to rest on the table by only its front and hind left flippers), and the only practical reconfiguration being a complete flip of the sculpture upside-down (e.g., approximately 180° rotation). The vastly different configurations of the object results in very little overlap between the point clouds shown in FIGS. 2C and 2D, thereby making it difficult for comparative global registration techniques to find the rigid transformation to register the two chunks.

Furthermore, even in cases where there is substantial overlap, it is sometimes difficult or impossible to unambiguously identify the overlapping regions of those point clouds without information about the alignment of the point clouds. Manual alignment, such as where a user labels at least three points in one of the point clouds and labels corresponding points in the other point cloud is possible, but very tedious for the user and imprecise. In typical automated solution, one challenge is automatically and unambiguously determining which portions of two different point clouds correspond to the same portion of the scanned object, and may be intractable for objects that are symmetrical in shape and color (e.g., balls, vases, cubes, and the like with repeating patterns or of a solid color).

Figure 3A:
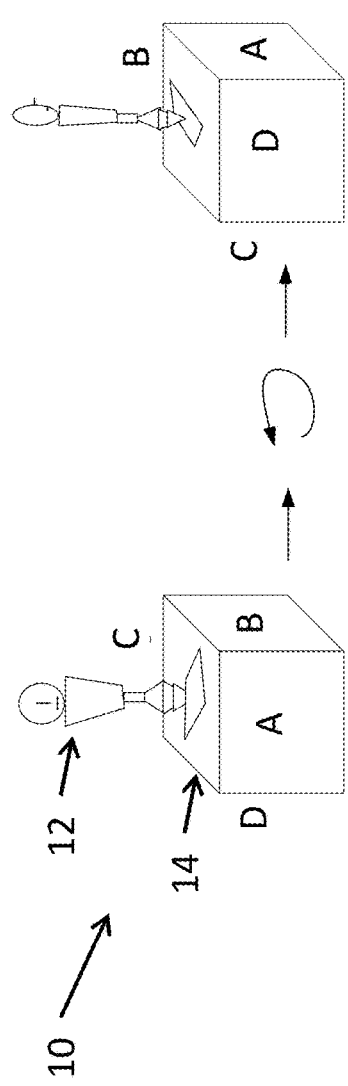
FIGS. 3A and 3B illustrate an ambiguous situation that may arise in aligning point clouds.
Figure 3B:
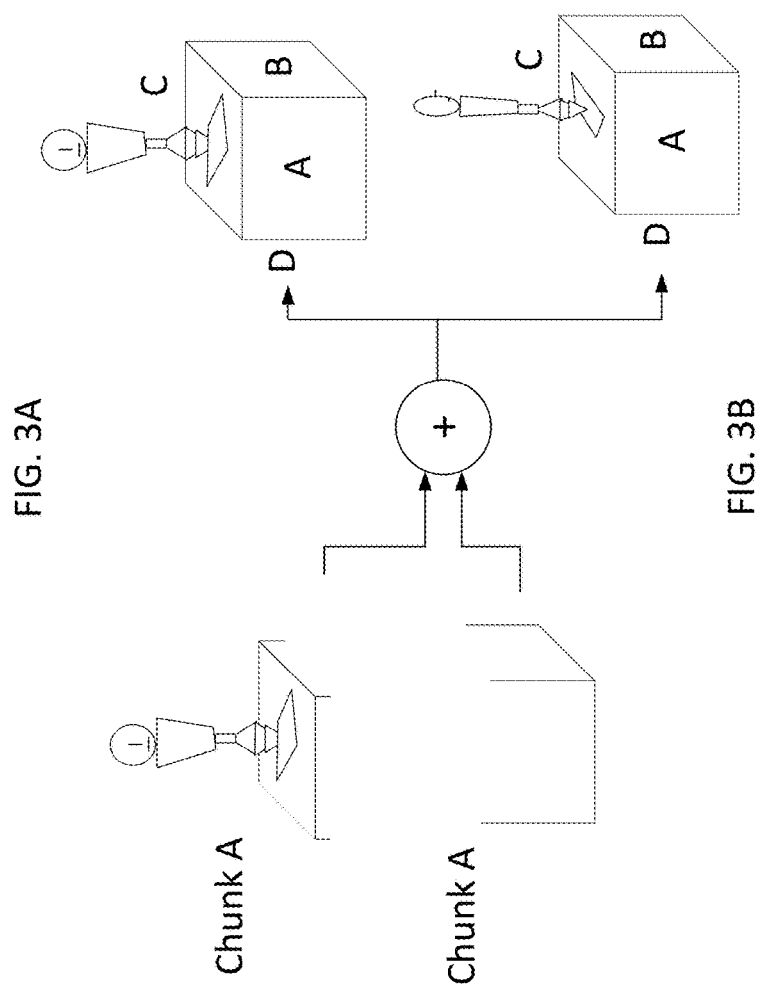

FIGS. 3A and 3B illustrate an ambiguous situation that may arise in aligning point clouds. FIG. 3A depicts, from two different angles, an object S that includes a figurine 12 perched on a cubical box 14. For the sake of discussion, four of the faces of the box 14 are labeled with the letters A, B, C, and D, and, as shown in FIG. 3A, the figurine 12 faces in the same direction as face A of the box 14.

FIG. 3B depicts scans of two different point clouds of the object 10. Point cloud A corresponds to the top of the object 10, which includes the figurine 12 and the top of the box 14, and point cloud B corresponds to the bottom of the object 10, which includes only a scan of the lower portion of the box 14. When attempting to align point cloud A with point cloud B automatically based on the shapes, it is ambiguous as to whether the upper result, with the figurine facing in the same direction as face A of the box (the correct alignment), or the lower result, with the figurine facing in the same direction as face B of the box (an incorrect alignment), is the correct reconstruction of the actual object.

To address some of these issues, aspects of embodiments of the present invention are directed to systems and methods for aligning separate scans of an object, where the object may be reconfigured or reoriented between the different scans. Some aspects of embodiments of the present invention are directed to systems and methods for receiving input from a user to initialize an automatic alignment process. The user input may assist the automated method of alignment in disambiguating between multiple potential alignments of the scans. Aspects of embodiments of the present invention are also directed to user interfaces for receiving this user input, as well as user interfaces for assisting in the creation of scans of objects and scenes.

Each scan produces a chunk, which is a point cloud obtained by aligning and merging one or more individual point clouds of the same object. In some circumstances, a chunk may be a point cloud corresponding to a single image captured by the depth camera at one position (e.g., a point cloud corresponding to a single depth image captured by the depth camera). While a single depth image contains depth information observable from a single view (e.g., one side of the boot), a chunk may encode depth information from multiple views, and may include information about the geometry of the object or scene that is not visible or computable from at least one of the views (e.g., one view included in the chunk provides information about a portion of the object or scene, where the portion is occluded in another view included in the chunk).

Therefore, aspects of embodiments of the present invention are directed to generating a three-dimensional (3D) model of an object that includes substantially all visible surfaces of the object (a "complete" 3D scan) or that includes opposite surfaces of the object (e.g., both the medial and lateral sides of a boot, as well as the sole of the boot) by aligning or merging multiple chunks (e.g., multiple point clouds), where the different chunks may correspond to the object in different configurations.

Aspects of embodiments of the present invention are directed to systems methods for assembling the chunks. The process of finding rigid body transformations of the chunks that stitch the chunks together will be referred to herein as "registration," and the use of registration data to align the chunks in a unified coordinate system will be referred to herein as "alignment."

One aspect of embodiments of the present invention relates to performing such registration and alignment operations on chunks, rather than individual depth frames or image frames, which significantly reduces the size of the problem, and, in many instances, enables substantially real-time feedback and registration during live scanning of the object. As such, aspects of embodiments of the present invention allow chunks to be assembled or combined while the user is performing a scan that is generating one of the chunks to be combined.

Aspects of some embodiments of the present invention are directed to systems and methods for automatically performing a rough initial alignment in which a bounding box is automatically fit to each chunk, and the bounding boxes of the chunks (a first bounding box and a second bounding box) are aligned using an appropriate criterion. The geometric transformation (e.g., rotation and translation) applied to the first bounding box to align it with the second bounding box is then applied to the first chunk. In many circumstances, this procedure produces a good approximate alignment between the first chunk and the second chunk, which facilitates completing the alignment using iterative closest point.

Another aspect of embodiments of the present invention relates to attempting automatic global alignment, in case the bounding box alignment fails. In such embodiments of the present invention, key points of the chunks may be automatically identified and matched.

Another aspect of embodiments of the present invention relates to a method for aligning two chunks when the above techniques based on bounding boxes and global alignment fail, and includes receiving user input for manually rotating a cloud point corresponding to one of the chunks (e.g., a previously acquired chunk), so that it becomes approximately aligned with the cloud point of the other chunk (e.g., a chunk that is currently being acquired). The two chunks may be concurrently displayed on a screen, thereby making it easy for the user to adjust the rotation of the first chunk until it is approximately aligned with the second chunk. For example, in the case of a touchscreen interface, the user may rotate the chunk by touching and dragging the first chunk or using an appropriate touchscreen gesture, such as touching two fingers to the screen and making a twisting motion. As another example, the user may use a three-dimensional gesture, such as pinching his or her fingers and twisting his or her hand to represent the grabbing and rotating of the first chunk (see, e.g., U.S. Pat. No. 8,686,943 "Two-dimensional method and system enabling three-dimensional user interaction with a device," issued on Apr. 1, 2014 and U.S. Pat. No. 8,854,433 "Method and system enabling natural user interface gestures with an electronic system," issued on Oct. 7, 2014, the entire disclosures of which are incorporated herein by reference).

While close overlap of the two rendered point clouds can be used as an approximate indicator of (or a proxy for) geometric alignment, this manual alignment may still be unsatisfactory, and may still lead to poor results using iterative closest point (ICP) to complete the alignment of the chunks. As such, in some embodiments of the present invention, the bounding box technique and/or the global alignment technique may be applied to the chunks, as roughly aligned by the user, in order to refine the alignment. When the automatic attempted registration and alignment is performed in the background while the user is manipulating the chunk, the manually rotated chunk can "snap" into place once the user has manipulated the chunk into a position that is close enough for the automatic registration and alignment technique to compute an alignment with high confidence.

These operations can be performed during the process of scanning the object (e.g., collecting one or more scans of the object), thereby providing the user with a view of the aligned chunks, and thereby making it easy for the user to identify which portions of the surface of the object have not been acquired yet and that thus still need to be scanned to obtain a model of the entire object.

Still another aspect of embodiments of the present invention relates to continuous scanning of an object with manipulation of the object, such as rotating and repositioning the object during the scan, without including the user's hand in the resulting scanned model.

Other aspects of embodiments of the present invention relate to user interfaces for providing feedback regarding the process of generating the 3D model and the use of the existing chunks. For example, multiple chunks captured of the same object may have varying degrees of overlap and, in some situations, there may be more than one configuration of chunks covering the full object surface, where some configurations may be of higher quality than other configurations. Aspects of embodiments of the present invention provide a user interface for a user to select which chunks to include in constructing the final global model.

In a typical workflow, a user performs a scan of a target object by using a scanner system such as a depth camera system to acquire a sequence of images of the target object from multiple angles. The multiple angles could be obtained by moving the camera around the object, and/or rotating the object (e.g., with the object on a turntable or in the user's hand). As the scanner is moved around the object, it captures depth and/or color images and constructs a 3D point cloud of the object. The user may stop the scanning process before the entire object has been scanned (e.g., before all of the visible surfaces of the object has been scanned) for various reasons, such as to reconfigure the object to reveal occluded surfaces after capturing all previously visible surfaces (e.g., turning over or flipping the object), to modify the lighting, or to rest. An arbitrary number of chunks can be generated in this way. Each separate scan of the object may be used to generate a "chunk" or "scan chunk" or point cloud, which is a 3D representation of the scanned portion of the object, and the chunks can be assembled according to embodiments of the present invention to generate a point cloud that, together, may represent a larger portion of the object than any individual chunk. If the combined chunks cover the entire object, then the resulting point cloud may be a complete 3D scan of the object. The point cloud representing the resulting complete 3D scan (or even a point cloud representing a partial 3D scan) can be textured and shaded (e.g., using color information captured by the scanner) to generate a completed 3D model of the physical object.

Scanner Systems

Generally, scanner systems include hardware devices that include a sensor, such as a camera, that collects data from a scene. The scanner systems may include a computer processor or other processing hardware for generating depth images and/or three-dimensional (3D) models of the scene from the data collected by the sensor.

The sensor of a scanner system may be, for example one of a variety of different types of cameras including: an ordinary color camera; a depth (or range) camera; or a combination of depth and color camera. The latter is typically called RGB-D where RGB stands for the color image and D stands for the depth image (where each pixel encodes the depth (or distance) information of the scene.) The depth image can be obtained by different methods including geometric or electronic methods. A depth image may be represented as a point cloud or may be converted into a point cloud. Examples of geometric methods include passive or active stereo camera systems and structured light camera systems. Examples of electronic methods to capture depth images include Time of Flight (TOF), or general scanning or fixed LIDAR cameras.

Some embodiments of the present invention are directed to hand-held 3D scanners. Such hand-held 3D scanners may include a depth camera (a camera that computes the distance of the surface elements imaged by each pixel) together with software that can register multiple depth images of the same surface to create a 3D representation of a possibly large surface or of a complete object. Users of hand-held 3D scanners need to move it to different positions around the object and orient it so that all points in the object's surface are covered (e.g., the surfaces are seen in at least one depth image taken by the scanner). In addition, it is important that each surface patch receive a high enough density of depth measurements (where each pixel of the depth camera provides one such depth measurement). The density of depth measurements depends on the distance from which the surface patch has been viewed by a camera, as well as on the angle or slant of the surface with respect to the viewing direction or optical axis of the depth camera.

Figure 4:
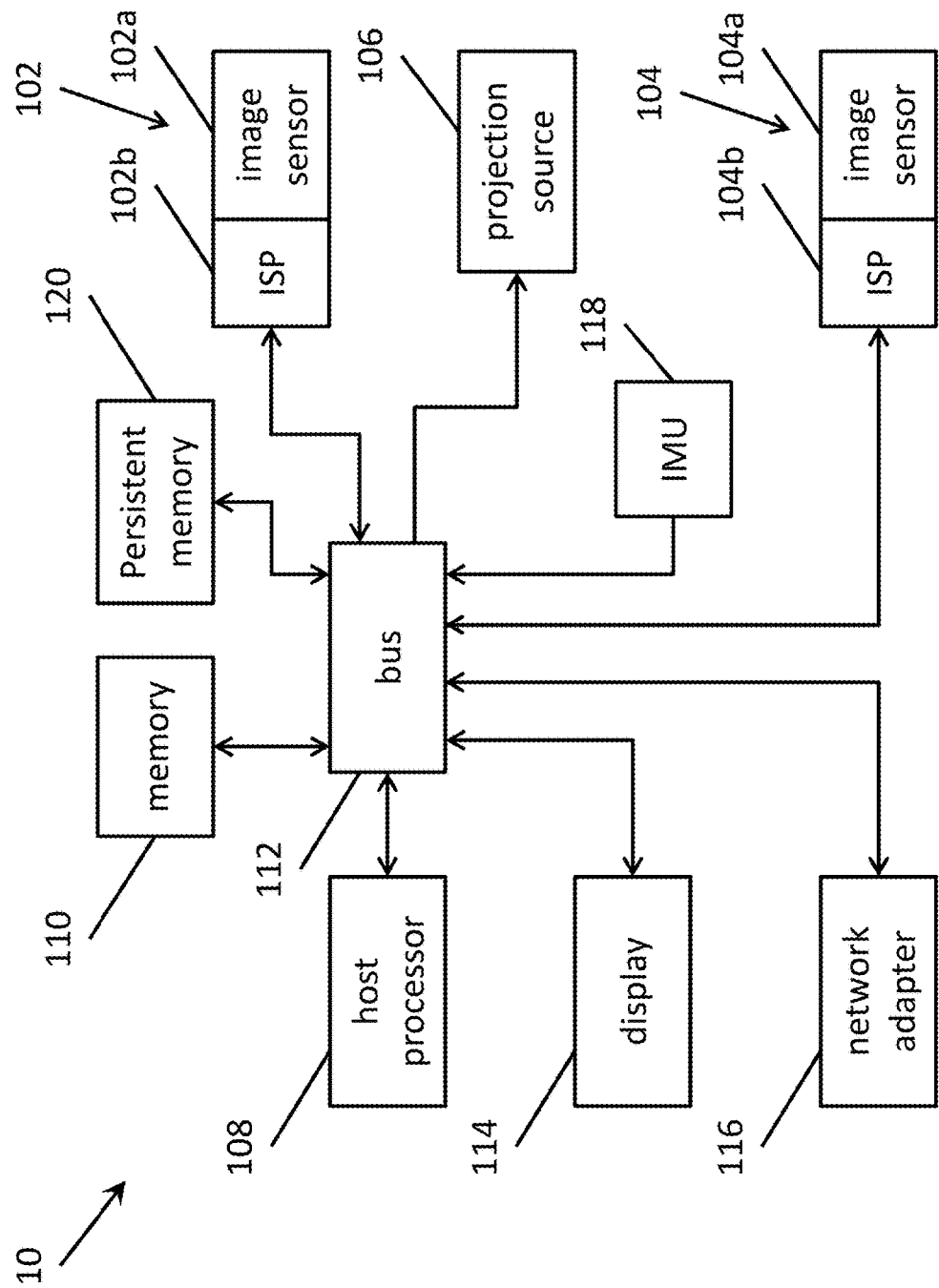
FIG. 4 is a block diagram of a scanning system as a stereo depth camera system according to one embodiment of the present invention.

FIG. 4 is a block diagram of a scanning system as a stereo depth camera system according to one embodiment of the present invention.

The scanning system 100 shown in FIG. 4 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The scanning system 100 may include additional components such as a display 114 to allow the device to display images, a network adapter 116 to communicate with other devices, an inertial measurement unit (IMU) 118 such as a gyroscope to detect acceleration of the scanning system 100 (e.g., detecting the direction of gravity to determine orientation and detecting movements to detect position changes), and persistent memory 120 such as NAND flash memory for storing data collected and processed by the scanning system 100. The IMU 118 may be of the type commonly found in many modern smartphones. The image capture system may also include other communication components, such as a universal serial bus (USB) interface controller.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels).

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3D point in the scene projects onto the same scanline index in the master and in the slave image. Let $u_m$ and $u_s$ be the coordinates on the scanline of the image of the same 3D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3D point with respect to the rectified cameras (that is, the length of the orthogonal projection of the point onto the optical axis of either camera).

Stereoscopic algorithms exploit this property of the disparity. These algorithms achieve 3D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3D details such as the one described in U.S. Pat. No. 9,392,262 "System and Method for 3D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

In some circumstances, the depth camera system includes two components: a detachable scanning component and a display component. In some embodiments, the display component is a computer system, such as a smartphone, a tablet, a personal digital assistant, or other similar systems. Scanning systems using separable scanning and display components are described in more detail in, for example, U.S. patent application Ser. No. 15/382,210 "3D Scanning Apparatus Including Scanning Sensor Detachable from Screen" filed in the United States Patent and Trademark Office on Dec. 16, 2016, the entire disclosure of which is incorporated by reference.

Although embodiments of the present invention are described herein with respect to stereo depth camera systems, embodiments of the present invention are not limited thereto and may also be used with other depth camera systems such as time of flight cameras and LIDAR cameras.

Depending on the choice of camera, different techniques may be used to generate the 3D model. For example, Dense Tracking and Mapping in Real Time (DTAM) uses color cues for scanning and Simultaneous Localization and Mapping uses depth data (or a combination of depth and color data) to generate the 3D model.

Assembling Chunks

Aspects of embodiments of the present invention are directed to methods for assembling chunks corresponding to different configurations or poses of an object or scene. One aspect relates to automatic chunk assembly, another aspect relates to user guided alignment, and a third aspect relates to continuous scanning with object manipulation.

Aspects of embodiments of the present invention are capable of aligning chunks independent of the configurations of independent chunks. The ways in which a target object is reconfigured between scans is typically depends on the shape of the object, the considerations of the environment (such as space constraints or lighting constraints where the user is performing the scanning), and the user's choice of reconfiguration. Because the assembly is performed by doing a global search over the entire solution space, the user has the freedom to reconfigure the object however they wish (so long as the reconfiguration does not change the underlying shape of the object). This allows the user to focus on the process of capturing all desired portions of the object, without having to understand how the system works internally or to perform the scan in particular ways in order to obtain a high performance result.

Figure 5B:
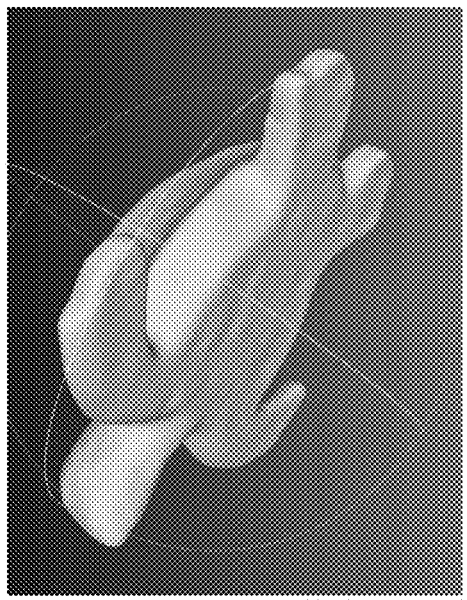
FIGS. 5A and 5B are views of a 3D model generating by assembling, according to one embodiment of the present invention, separate chunks corresponding to the models shown in FIGS. 3C and 3D.
Figure 5A:
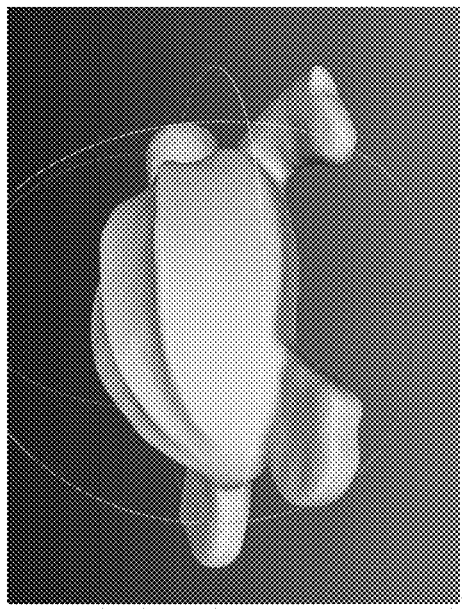

FIGS. 5A and 5B are views of a 3D model generating by assembling, according to one embodiment of the present invention, separate chunks corresponding to the models shown in FIGS. 3C and 3D. As seen in FIGS. 5A and 5B, the separate chunks of the dorsal and ventral portions of the sculpture of the sea turtle are successfully combined into a single 3D model, despite the substantial reconfiguration of the object between the scans and despite the small overlap in the scans.

Chunk Assembly

As described above, a user may perform a scan of an object by moving a scanner around the object to generate a point cloud of the object. The point cloud or chunk may be incomplete due to occlusions, and therefore the user may reconfigure or reposition the object to expose an occluded surface, and perform another scan to capture a point cloud containing the now-visible surface.

However, if the object has been reconfigured between the capture of these two chunks, then the corresponding two point clouds will be completely out of alignment. As a result, a global registration method may be needed to find a rigid transformation because local registration is unlikely to find a transformation from one point cloud to the other (e.g., the local registration technique may not consider rotations greater than a maximum angle, but the point clouds may be out of alignment by more than that maximum angle). Comparative global registration techniques are computationally expensive, and it may computationally impractical to compute global registrations across the entire data set of all of the frames of data captured during the scans.

Therefore, one aspect of embodiments of the present invention is directed to the automatic alignment of chunks, rather than individual frames. Even when applying global registration techniques, it is feasible to attempt global registration of these chunks because there are one or more orders of magnitude fewer chunks than depth frames, and, in many instances, it is possible to provide substantially real-time feedback and registration of chunks during live scanning.

Figure 6A:
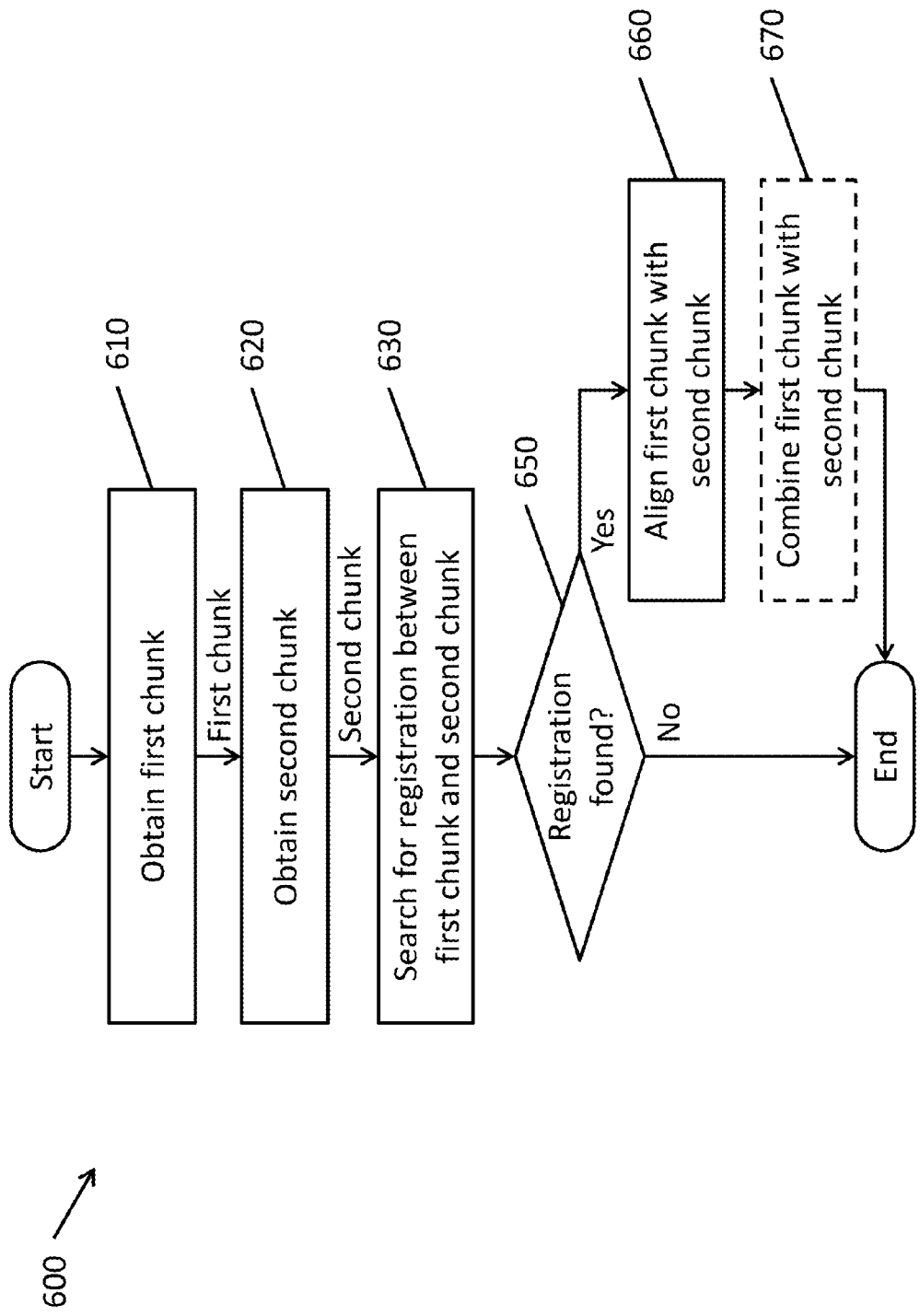
FIG. 6A is a flowchart illustrating a method of performing a scan according to one embodiment of the present invention.

FIG. 6A is a flowchart illustrating a method 600 of performing a scan according to one embodiment of the present invention. The method may be implemented by a scanning system 100, a remote processing system, such as a cloud computing system connected to the scanning system 100 over a network (e.g., via the network adapter 116), or combinations thereof (e.g., where some operations are performed by the scanning system 100 and other operations are performed by the remote processing system), where a processor (e.g., host processor 108) is configured to execute instructions stored in a memory (e.g., memory 110 and/or persistent memory 120) to perform the operations of the method.

In operation 610, the scanning system 100 obtains a first chunk of a scene or an object. As noted above, a chunk is a representation of the scene or object, or a portion thereof, in the form of a point cloud or other format for representing a three dimensional shape. The representation of the 3D shape of a scene or object may be constructed by registering and aligning (and/or combining) multiple depth frames captured by the scanning system 100, such as by applying iterative closest point (ICP), to create a 3D model. The first chunk may be stored in the memory 110 and/or the persistent memory 120 of the scanning system.

In operation 620, the scanning system 100 obtains a second chunk of the scene or the object. The second chunk may correspond to a second scan of the scene or object, and the user may have reconfigured the object (e.g., by rotating or flipping the object) to reveal previously occluded portions of the object, before beginning the second scan. As such, the second chunk may contain representations of portions of the object that are not represented in the first chunk.

In operation 630, the scanning system 100 searches for a registration between the first chunk and the second chunk, such as by searching for unambiguously overlapping or common regions of the first chunk and second chunk, and identifying a rigid transformation (e.g., rotation and translation) of the first chunk to align the overlapping regions of the first and second chunks.

Figure 6B:
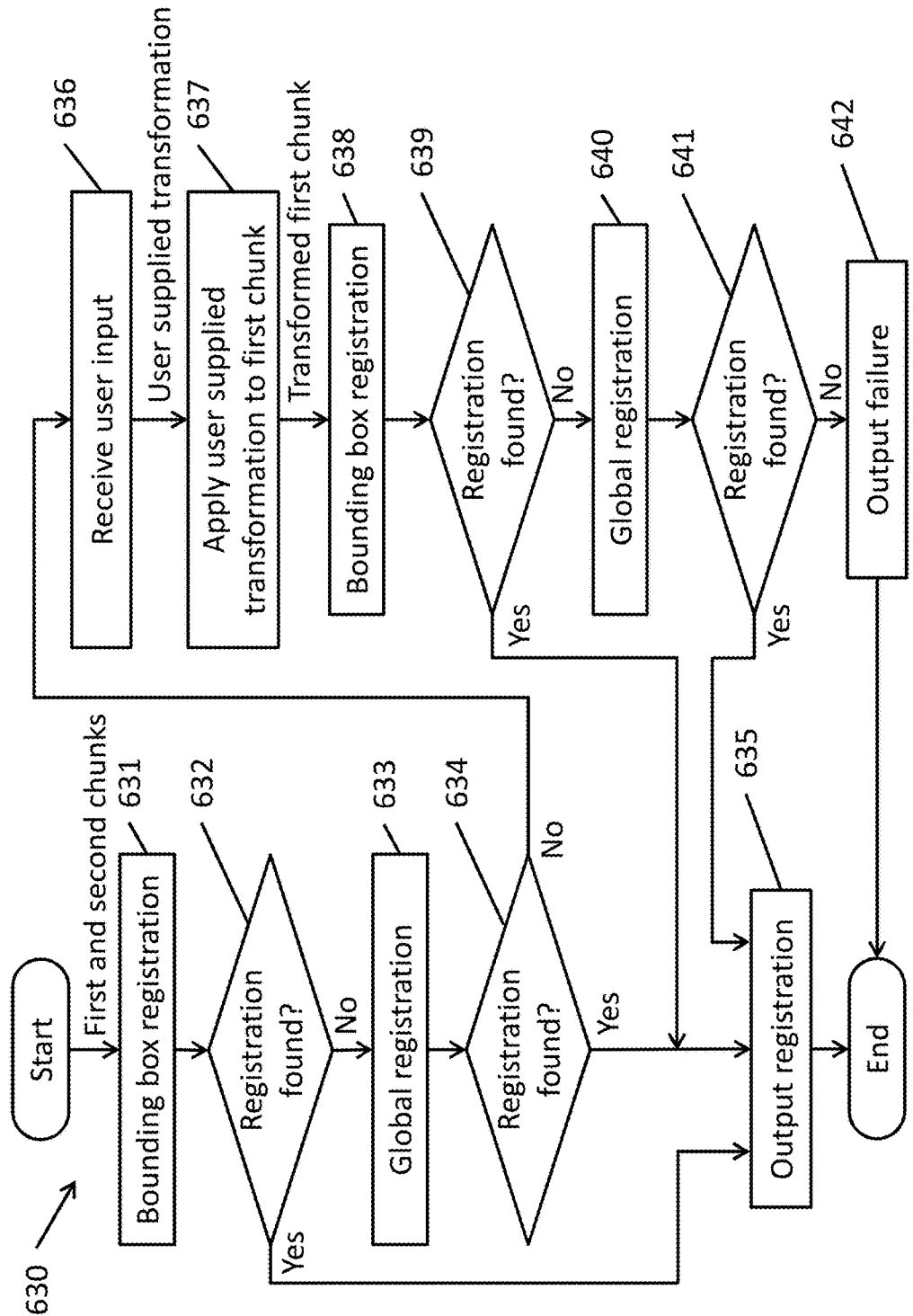
FIG. 6B is a flowchart illustrating a method of searching for a registration of two chunks according to one embodiment of the present invention.

In some embodiments, the search for a registration of the first chunk with the second chunk includes a multi-stage process, in which a plurality of different techniques are attempted in sequence until one of them succeeds or all of them fail. FIG. 6B is a flowchart illustrating a method of searching for a registration of two chunks according to one embodiment of the present invention. Referring to FIG. 6B, in one embodiment, the registration search begins with attempting, in operation 631, to compute bounding boxes of the chunks and attempts to register the chunks using the bounding boxes. If the bounding box method 631 succeeds, then the computed registration is output in operation 635, but if the bounding box method 631 fails, then the search continues with a global registration of the chunks based on key points in operation 633. If the global registration 633 succeeds, then the computed registration is output in operation 635, but if it fails, then the registration search may request user input to assist in the registration. If the user provides input (e.g., a user supplied transformation of the first chunk) in operation 636, then the automatic bounding box and/or global registration techniques may be re-attempted in operations 638 and 630 with the first chunk transformed in operation 637 in accordance with the transformation supplied by the user. If the re-attempted automatic registration techniques fail or the user does not supply an input, then the search for registration is considered to have failed in operation 642.

Bounding Box Registration

In some embodiments of the present invention, the global search can be accelerated by defining bounding boxes around each of the chunks testing the registration of the bounding boxes as potential initial conditions for an automatic registration process (e.g., a local registration process such as ICP). A bounding box for a chunk refers to a three dimensional box or cuboid of minimum volume that contains the chunk, which may be found using the rotating calipers method known in the field of computational geometry. It is assumed that the target object does not change in volume during the reconfiguration. Therefore, the dimensions of the bounding boxes for the first and second chunks are assumed to be the same (e.g., congruent or substantially congruent). Depending on the aspect ratio of the cuboid, there is a limited number of possible transformations that map the first bounding box onto the second bounding box. For example, if all three dimensions of the cuboid (e.g., length, width, and height) of the cuboid are different, then there are four possible rigid transformations of the first bounding box onto the second bounding box. If exactly two of the dimensions are the same (e.g., a square cuboid), then there are eight possible rigid transformations of the first bounding box onto the second bounding box, and if all three dimensions are the same then there are twenty four possible rigid transformations of the first bounding box onto the second bounding box.

Each of these possible transformations corresponds to a potential starting point for an automatic registration technique, such as an iterative closest point technique. However, there are some instances where the bounding box technique will fail to provide useful starting points. For example, in some types of objects, such as spheres (e.g., a basketball) or cylinders (e.g., a soup can), the locations of the corners of a bounding box may not be uniquely defined with respect to the object, and therefore the initial positions suggested by the bounding box technique may not actually provide initial conditions that are close to the correct alignment.

Figure 7:
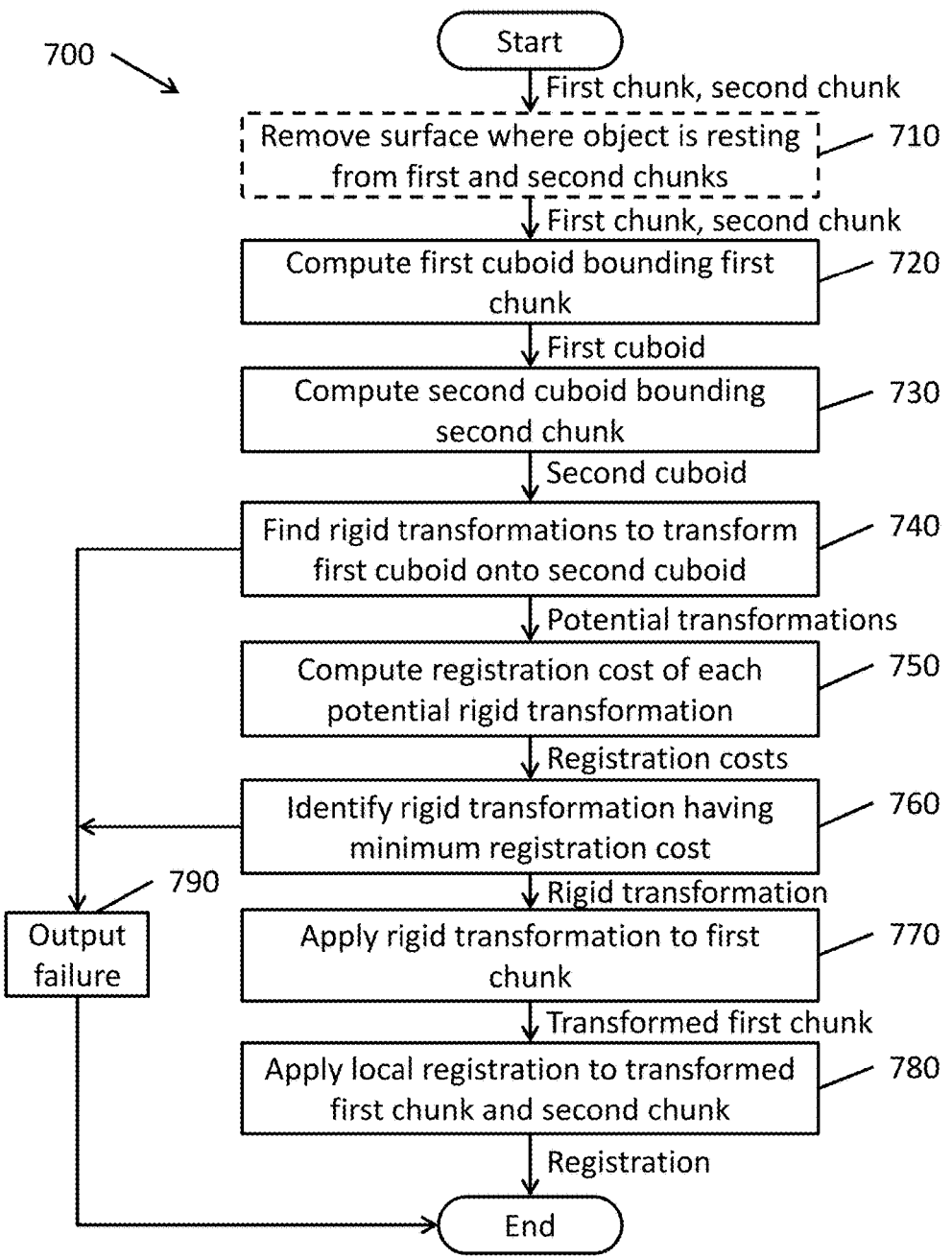
FIG. 7 is a flowchart illustrating a method for bounding box alignment according to one embodiment of the present invention.

FIG. 7 is a flowchart illustrating a method 700 for bounding box registration according to one embodiment of the present invention. In some embodiments, this method 700 is be applied as the bounding box registration 631 of FIG. 6B. In operation 710, the scanning system 100 removes, from the first and second chunks, the surface where the object is resting, if the surface has not already been removed from the chunks. Typically, a scan will accumulate a point cloud that includes not only the target object but also the surrounding area, such as the surface that the object is resting on. When the target object is reconfigured, the surface will remain in the same physical location, but the target object will be rotated. Because the location of the surface, relative to the object, is different after reconfiguration, it would be difficult, if not impossible, to register both the surface and the object. Assuming that the surface is planar, the plane equation representing the location of the surface can be estimated from a single depth image through a technique such as random sample consensus (RANSAC), where points greater than a threshold (e.g., 2 centimeters) can be removed from the chunk, thereby leaving only points corresponding to the target object in the point cloud.

In operations 720 and 730 respectively, the scanning system 100 computes, a first cuboid that forms a bounding box around the first chunk, and a second cuboid that forms a bounding box around the second chunk. Because the removal of the surface may also remove some points corresponding to the object, in some embodiments, the points obtained by projecting the point cloud onto the plane are also considered when computing the bounding box.

In operation 740, the scanning system 100 calculates a set of rigid transformations to transform the first cuboid onto the second cuboid. It is assumed herein that the first cuboid and the second cuboid have substantially the same dimensions (e.g., length, width, and height). In the event that the computed cuboids are of significantly different dimensions (e.g., completely different shapes due to the particular shapes of the separate chunks), then the bounding box registration technique may be considered to have failed in operation 790 in that particular instance and the process may continue with the next stage.

As noted above, in the case where the three dimensions of the cuboids are all different (e.g., different length, width, and height), then there are four transformations of the first cuboid to the second cuboid. When two of the dimensions are the same and the third is different, there are eight transformations of the first cuboid onto the second cuboid. When all three of the dimensions are the same, then there are twenty four transformations of the first cuboid onto the second cuboid.

In operation 750, the scanning system 100 computes a registration cost of each of these potential rigid transformations, where a registration cost is a metric of the mismatch between the first chunk and the second chunk if aligned in accordance with the transformation under consideration. The registration cost may also be treated as a confidence of the quality of the match. The registration cost may include, or be modified, by information such as the inconsistency between matching points of the first chunk and second chunk (e.g., points of the point clouds of the first and second chunks in the same location, or substantially the same location that have different colors, the presence of large surfaces in the alignment that would be occluded in the combined model, and differences in shape between the first and second chunks in regions of overlap). As such, computing a registration may include searching for a rigid transformation from the first chunk to the second chunk having a minimum registration cost, or a registration cost below a threshold level.

In operation 760, a transformation from among the potential transformations is selected based on comparing the registration costs. For example, a transformation having the best (e.g., lowest) registration cost may be selected. In some embodiments, the selected potential transformation is also subject to meeting a threshold level. For example, a transformation having a lowest registration cost may still fail to meet a requirement that the registration cost be below a threshold level. If so, then the bounding box technique may have failed and a failure state may be output in operation 790.

In operation 770, the rigid transformation is applied to the first chunk, and in operation 780 a local registration technique may be applied to refine the registration between the first and second chunks. The final computed registration may then be output as the result of the bounding box registration.

In some embodiments, the aligned first and second chunks can then be output and saved as a combined chunk. The combined chunk may be used for registration and alignment with other chunks, or may be saved and output as a final model of the object.

Global Registration

In one embodiment of the present invention, a global registration technique searches for unambiguous common or overlapping regions by identifying key points of the first chunk and the second chunk. The key points can be identified, for instance, by color (e.g., identifying common textures on the surfaces of the chunks), shape (e.g., identifying one or more portions of the two chunks having the same two-dimensional shape), and surface normal (e.g., identifying one or more portions of the two chunks having the same three-dimensional shape). Examples of techniques for detecting key points (or local features) include the scale-invariant feature transform (SIFT), speeded up robust features (SURF), and maximally stable extremal regions (MSER). See also R. Szeliski. "Computer Vision: Algorithms and Applications", Springer, 2010 pp. 181 et seq., U.S. Provisional Patent Application No. 62/472,543, filed in the United States Patent and Trademark Office on Mar. 16, 2017, and U.S. Provisional Patent Application No. 62/520,353, filed in the United States Patent and Trademark Office on Jun. 15, 2017 the entire disclosures of which are incorporated by reference herein. Examples of ambiguous overlapping regions include, for example, the portions of the boxes described above with respect to FIGS. 2A and 2B and portions of objects having uniform shape (e.g., long curves and flat surfaces) and no texture (e.g., flat colors) or repeated patterns or textures.

In some circumstances, in order to control the expenditure of computational power (e.g., in terms of CPU cycles and energy), the search is subject to a limit such as a time limit, a limit on the number of iterations of search performed, a number of search configurations considered, or a magnitude of a transformation (e.g., a maximum rotation, maximum translation, or combination thereof). If no registration is found within the limit, then the search performed in operation 630 may return with an indication that the attempted registration failed, e.g., that no registration was found.

User Guided Registration

In some circumstances, the automatic registration and alignment of chunks may fail, even when there is some overlap in the chunks, because the initial alignment of the chunks is significantly different. For example, the search for registration between the first chunk and the second chunk in operation 630 (or operation 920) may fail because the first chunk and second chunk are significantly misaligned, and the process of identifying the proper registration exceeded a processing limit.

Figure 8A:
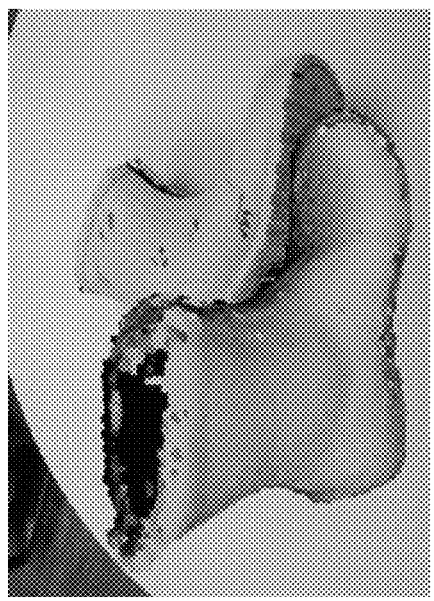
FIG. 8A is a screenshot of a portion of a user interface according to one embodiment of the present invention showing a captured chunk of a boot in a configuration where the boot rests on its sole, where the chunk is overlaid on a real-time view of an image captured by a camera.

In a user guided registration aspect of embodiments of the present invention, the user provides feedback to the scanning system 100 to register the first chunk (or first partial scan) to the second chunk (or second partial scan). In some embodiments of the present invention, a representation of the currently captured point cloud may be displayed during the scanning process on a screen, such as display 114 of the scanning system 100 as an overlay on a live view of the images captured by the sensor of the scanning system 100 (e.g., one of the cameras 102 or 104, or the "master camera"). This may provide the user with real-time feedback on the progress of the scan. FIG. 8A is a screenshot of a portion of a user interface according to one embodiment of the present invention showing a captured chunk of a boot in a configuration where the boot rests on its sole, where the chunk is overlaid on a real-time view of an image captured by a camera. Portions depicted in green correspond to the isolated chunk of the target object, and portions depicted in red correspond to automatically removed portions corresponding to the surface that the boot is resting on.

Figure 8B:
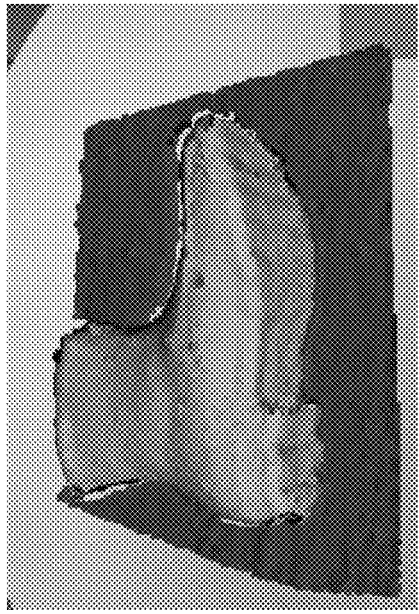
FIG. 8B is a screenshot of a portion of a user interface according to one embodiment of the present invention showing the captured chunk of the boot shown in FIG. 8A, overlaid on a real-time view of an image captured by a camera.

After reconfiguring the actual target object, the previously captured model (e.g., a previously captured chunk) may still be displayed on the screen, but may now be significantly misaligned with the actual target object. FIG. 8B is a screenshot of a portion of a user interface according to one embodiment of the present invention showing the captured chunk of the boot shown in FIG. 8A, overlaid on a real-time view of an image captured by a camera. As shown in FIG. 8B, the actual boot has been reconfigured such that it is resting on its side, thereby exposing the sole of the boot, but the previously captured model is still shown in the position with the sole side down.

To register the previously captured chunk with the actual target object, the user may reconfigure the previously captured chunk to roughly align the two chunks. (In a sense, the user may reconfigure the model of the object in the same way that the actual target object was reconfigured.) The user may supply this input using, for example, a drag operation on a touchscreen (e.g., on the display 114) or with a mouse, by performing a three-dimensional gesture, for example, in the view of the sensors of the scanning system 100 (e.g., in view of the cameras 102 and 104), by moving the sensors (e.g., the scanning system 100 in the case where the sensors are integrated with the display, or the scanning component in the case where the sensors are detachable or separate from the display) to align the current view of the object with the model, or through combinations of these techniques. In the case of the three-dimensional gesture, the user may, for example, make a gesture to grasp or pinch the model and twist or move his or her hand to rotate and translate the model to a new configuration. Examples of systems and methods for detecting three-dimensional gestures using depth cameras are described in, for example, U.S. Pat. No. 8,686,943 "Two-dimensional method and system enabling three-dimensional user interaction with a device," issued on Apr. 1, 2014 and U.S. Pat. No. 8,854,433 "Method and system enabling natural user interface gestures with an electronic system," issued on Oct. 7, 2014, the entire disclosures of which are incorporated herein by reference.

Figure 8C:
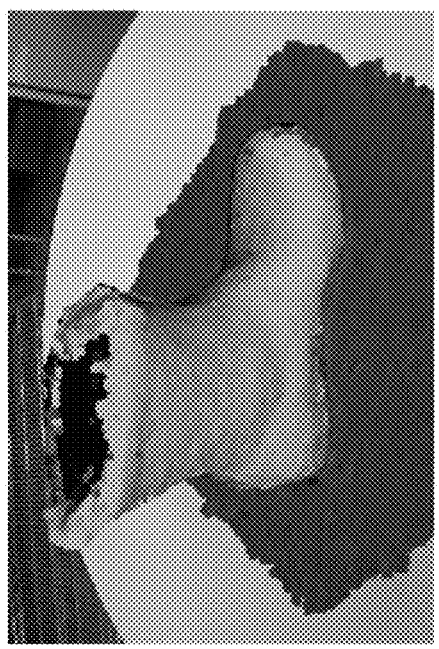
FIG. 8C is a screenshot of a portion of a user interface according to one embodiment of the present invention showing the previously captured chunk of the boot shown in FIG. 8A, overlaid on a real-time view of an image captured by a camera.

The scanning system 100 receives the user input in operation 636 of FIG. 6B, and in operation 637, the scanning system applies the user supplied transformation to the first chunk. FIG. 8C is a screenshot of a portion of a user interface according to one embodiment of the present invention showing the previously captured chunk of the boot shown in FIG. 8A, overlaid on a real-time view of an image captured by a camera. As shown in FIG. 8C, the user has performed a rough alignment of the boot with the actual boot by rotating the model or previously captured chunk of the boot, such that the previously captured chunk is also on its side.

For example, this may occur at the first frame or after just a few frames of the second scan. In such an embodiment, the user may pause the second scan and provide the system with a rough alignment of the new object configuration with the previous object configuration. This allows the scanning system 100 to attempt to search for a registration using the new initial conditions (the user-supplied transformation of the first chunk to align, roughly, the first chunk with the second chunk) to register and align the chunks, and then resume the scanning process as if it were one continuous session. If the rough alignment provided by the user is close enough to the actual new alignment, the registration method will be able to identify the correct transformation quickly, especially compared to the general case of attempting to perform a global search.

Contrary to comparative methods where such alignment is performed by marking at least three corresponding points in the different point clouds to be aligned, in this approach the user is asked to provide a rough alignment of the point clouds by simply rotating one or more point clouds.

In operation 638, a bounding box registration may be applied to the transformed first chunk and the second chunk. The bounding box registration in operation 638 may be substantially similar to the bounding box registration described above with respect to FIG. 7, but some operations may be omitted. For example, there is no need to find the set of all rigid transformation from the first cuboid onto the second cuboid, because the user supplied transformation is assumed to have resolved any ambiguity as to which of the possible transformations is the correct one. Instead, the scanning system 100 finds three matching vertices of the first and second cuboids. For example, the scanning system may arbitrarily choose three vertices of the first cuboid and, assuming that the user supplied transformation is correct, the three vertices of the second cuboid that are closest to the selected three vertices of the first cuboid are corresponding vertices. These closest vertices may be found based on a minimum cost assignment, where the cost is the sum of the Euclidean distances of the matching vertices, and the minimum cost assignment can be found using, for example, the Hungarian algorithm or can be approximated by iteratively matching the closest vertex.

Once the matching vertices are found, the scanning system 100 finds a rigid transformation (e.g., a roto-translation) to transform the selected vertices of the first cuboid onto the matching vertices of the second cuboid. In one embodiment, a least-squares technique can be used to compute the rigid transformation of the vertices.

The scanning system 100 can then apply the rigid transformation to the transformed first chunk (the first chunk after it has been transformed by the user supplied transformation), thereby bringing the first chunk in closer alignment with the second chunk.

From this point, the process may continue as before with operation 780 of FIG. 7, where a local registration technique may be used to refine the registration of the first and second chunks.

Figure 8D:
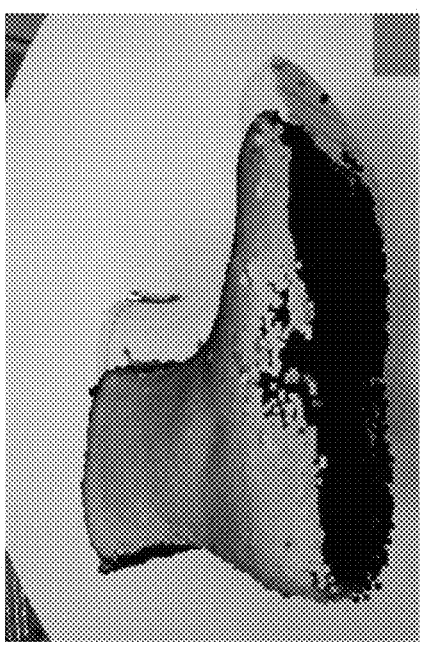
FIG. 8D is a screenshot of a portion of a user interface according to one embodiment of the present invention showing the automatic alignment of the rotated previously captured chunk with the chunk produced during the current scan of the boot.

FIG. 8D is a screenshot of a portion of a user interface according to one embodiment of the present invention showing the automatic alignment of the rotated previously captured chunk with the chunk produced during the current scan of the boot. As a result, the sole of the boot, captured in the current scan, is combined with the previously captured chunk.

This rough alignment helps the scanning system 100 to register the previous chunk or chunks with the reconfigured object, without having to wait until all of the chunks have been captured. The effort required of a user to perform the rough alignment is far lower than in a comparative method for aligning point clouds where, for instance, the user labels three or more points on each of the different point clouds. Instead, so long as the rough alignment is "close enough," a technique such as ICP can be used to refine the rough alignment automatically, without further user input. This improves the user experience by removing much of the work and careful selection of points associated with manual alignment.

Because the registration of the new configuration can be performed on the first frame (or first few frames) captured after the target object has been reconfigured, this method allows for the full model (the previously captured chunks) obtained from scans from previous configurations to be displayed, in real-time, on the display for the current scan, thereby providing continuous feedback to the user who can then easily see which parts of the target object are still to be acquired, so long as at least some common parts of the model to be visible in the previously captured chunks and the current chunk.

Returning to FIG. 6A, in operation 650, if a registration is found, then the scanning system 100 proceeds to operation 660 to align the first chunk with the second chunk by applying the transformation to the first chunk. The scanning system 100 may also combine first chunk and the second chunk in operation 670, so that later chunks can be registered with the combined chunk. The combining of the chunks can be performed by grouping the chunks together while maintaining the internal representations separate (e.g., multiple separate point clouds grouped together) or the internal representations can be merged. The merging may be performed by combining the point clouds of the first and second chunks, including transforming the first chunk to the coordinate system of the second chunk in accordance with the registration, combining matching points of the first chunk and second chunk (e.g., if a point from the point cloud of the transformed first chunk is very close to a point from the point cloud of the second chunk, one of those points can be discarded), potentially removing extraneous or spurious points in the regions of overlap, and adding the unique points from the first chunk and the second chunk (e.g., including, in the point cloud of the merged chunk, the points from the non-overlapping regions of the first and second chunks). If no registration is found, then the process of attempting to combine the two chunks is complete.

Background Assembly of Chunks During Scan

Figure 9:
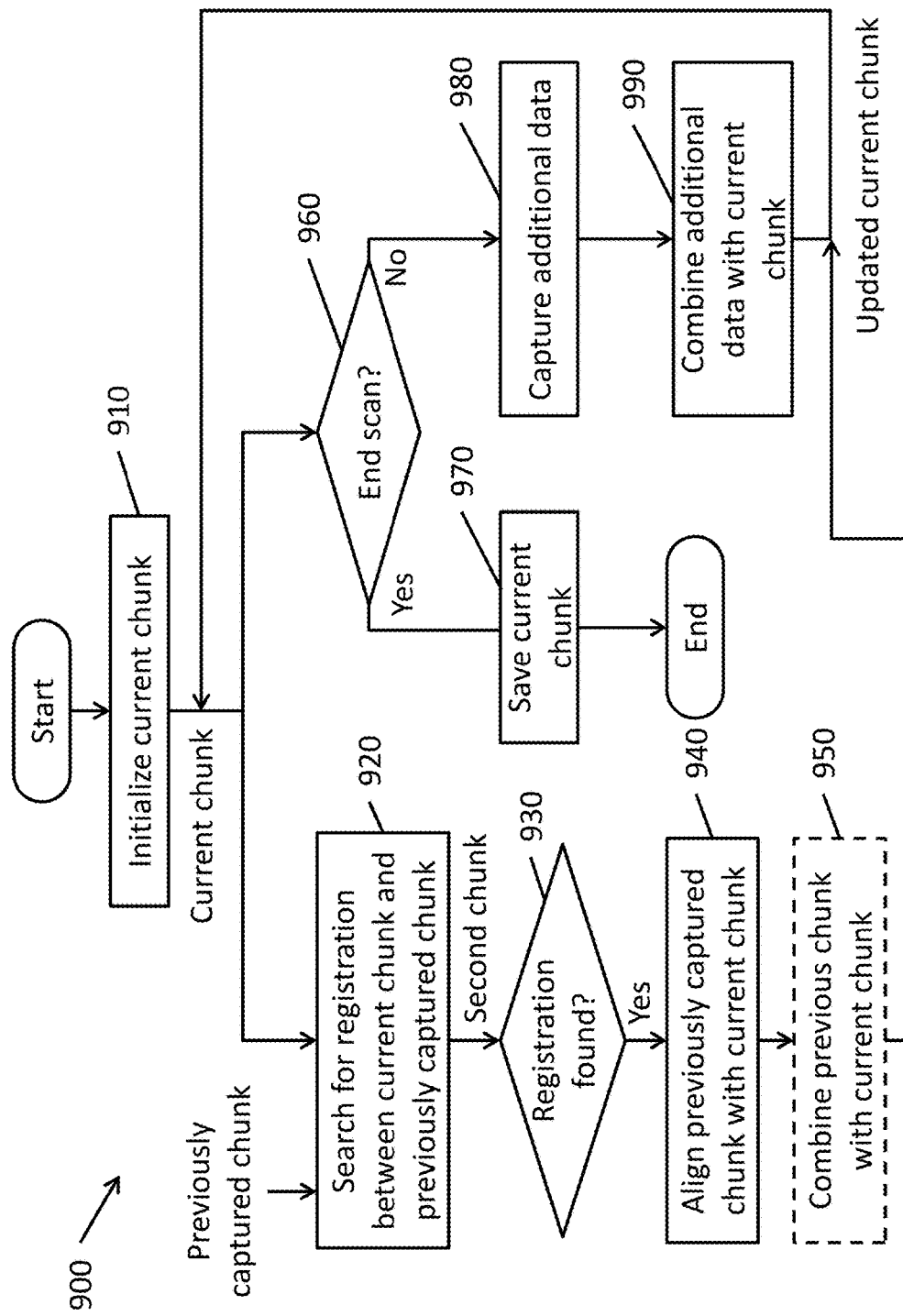
FIG. 9 is a flowchart illustrating a method for performing automatic background assembly according to one embodiment of the present invention.

Another aspect of embodiments of the present invention relate to automatic background assembly of chunks during a scan, as shown in FIG. 9. For example, the scanning system 100 may store, in memory 110, a first chunk corresponding to a first scan of an object. While the scanning system is capturing a second scan of a different portion of the same object to construct a second chunk, the scanning system 100 may concurrently attempt to align the second chunk with the first chunk, for example in accordance with the method described above with respect to FIG. 6A.

Referring to FIG. 9, in operation 910, in a first execution thread or process, the scanning system 100 captures a depth frame and initializes a current chunk, such as by converting the depth frame into a point cloud. In operation 920, the scanning system 100 searches for a registration between the current chunk and a previously captured chunk, which may be stored in memory 110. The searching for registration may be performed by a separate thread or process (e.g., a background process) and may use the technique described above with respect to FIG. 6A to attempt to identify, unambiguously, a sufficiently large overlapping region between the current chunk and the previously captured chunk.

If a registration is found, then, in operation 940, the previously captured chunk is aligned with the current chunk, and may be combined with the current chunk in operation 950, in which case the current chunk may be updated to include the previous chunk.

In operation 960, the scanning system 100 determines if the user has ended the current scan, such as by supplying an "end scan" command via a user interface. If so, then in operation 970 the scanning system 100 stores the current chunk (e.g., in memory 110 and/or persistent memory 120), and the current scan ends. The saved chunk may later be combined with other chunks or may be exported on its own (e.g., saved to cloud storage).

If the user has not ended the scan, then the first execution thread or process may continue by capturing additional data (e.g., another depth frame) in operation 980, combining the depth frame to the current chunk in operation 990, and returning to operation 960 to determine if the user has ended the scan yet. The separate thread or process may re-attempt alignment after the current scan has progressed further and more information has been added to the second chunk, thereby increasing the likelihood of overlap with the first chunk. (In some embodiments of the present invention, the scanning system provides feedback to the user to increase the amount of overlap by suggesting the scanning of portions of the object that were scanned during the first scan.) This automatic alignment of chunks can be performed during a scan (e.g., operating on a chunk from an incomplete scans) or after a scan (e.g., operating only on chunks from completed scans), and improve the user experience in creating a 3D model of an object from multiple, separate scans. If the automatic alignment of chunks is performed during the scan, the separate thread may attempt alignment after every frame of additional data is captured, the separate thread may attempt alignment at a particular interval (e.g., every second or every ten frames), or based on availability of processor time (e.g., when the host processor is idle).

While the method shown in FIG. 9 for automatically searching for registration of a chunk with an in-progress scan is described in the context of attempting to match one previously captured chunk with the current scan, embodiments of the present invention are not limited thereto. For example, multiple separate chunks may be stored in memory 110, and the scanning system 100 may be configured to search for a match between the current chunk and each of the stored chunks to determine if any of them can be registered with the current chunk.

While embodiments of the present invention are described above with respect to storing chunks in memory 110, embodiments of the present invention are not limited thereto. For example, the memory 110 may not be sufficiently large to store all of the current chunks. As such, the chunks may be stored in persistent memory 120, and reduced size (or decimated) versions of the chunks may be stored in memory 110, and the processes for searching for overlapping regions of the chunks are performed on the decimated versions of the chunks. Decimating the chunks in this way may also improve the speed of registration of chunks due to the smaller data sets, but may, in some instances, reduce the accuracy of the result.

Example Workflow

Figure 10:
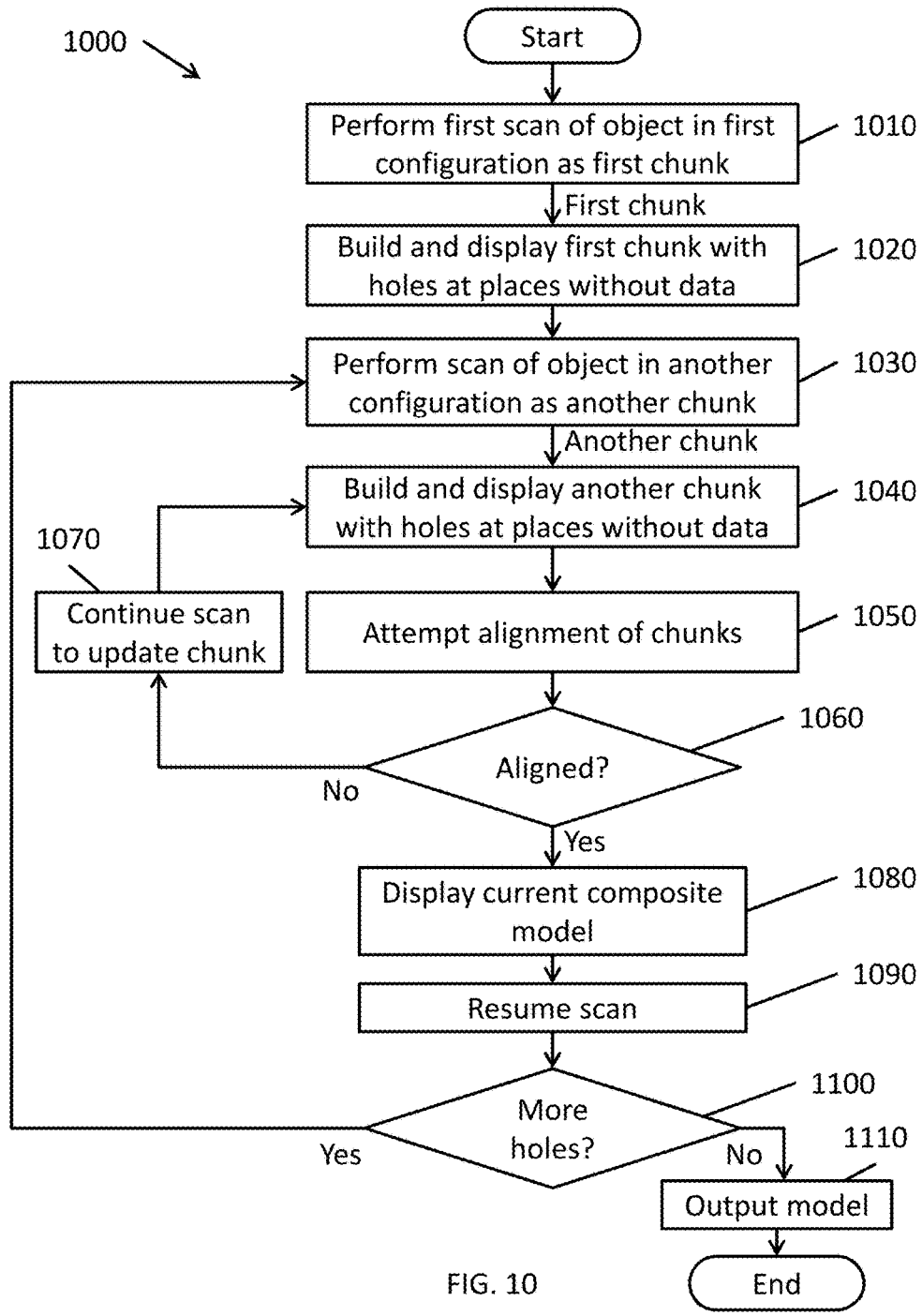
FIG. 10 is a flowchart of an example workflow for scanning a target object using a scanning system according to one embodiment of the present invention.

FIG. 10 is a flowchart of an example workflow for scanning a target object using a scanning system according to one embodiment of the present invention. In operation 1010, the scanning system 100 performs a first scan of an object in a first configuration (e.g., a boot with the sole resting on a supporting surface), and in operation 1020, the scanning system 100 builds and displays (e.g., on the display 114) the first chunk, where portions for which the system does not have any data are represented as holes (e.g., the absence of points in the point cloud).

After completing the first scan, the user may reconfigure the target object such that previously occluded portions are visible and, in operation 1030, the user may perform another scan of the object in the new configuration (e.g., a second configuration). This scan can also be used to build and display another chunk in operation 1040. As noted above, the user may choose to align the first chunk with the current chunk.

In addition, in a background process, the scanning system may attempt to automatically align the previous chunk with the another chunk in operation 1050. If no alignment is found, then additional data may be collected from the current scan, and alignment can be reattempted when more data has been collected. If alignment is found, then in operation 1070, the scan continues and the chunk is updated to add more data, and proceeds with building and displaying the current chunk with the updated data. If the chunks are aligned, then the current composite model (the combined chunks) is displayed in operation 1080. At this stage, in operation 1090, the user may continue scanning the visible but not already scanned parts of the target object (e.g., the holes) while new parts are added to the current composite model.

In operation 1100, there may still be more holes that are not yet filled by a scan. If so, the user may reconfigure the object and the process may continue with operation 1030, where another scan is performed with the target object in the new configuration. The process may continue until the user is satisfied with the model produced (e.g., no more holes), in which case the process may end and the resulting model may be output in (e.g., stored or transmitted for use in another context) in operation 1110.

Continuous Scanning with Object Manipulation

Some aspects of embodiments of the present invention relate to enabling scanning an object while the user holds and manipulates the object. For example, the user may hold the object in one hand while holding the scanning system in the other hand. As another example, the scanning system 100 may continue to capture data while the user reconfigures the target object. In some of these embodiments, the scanning system continuously tracks the evolving or changing configuration of the object using the same procedure as in normal scanning workflow, described above. By rotating the object through various poses, the scanning system can capture views of various sides of the object. However, because the hand of the user holding the object is captured during the scan, aspects of embodiments of the present invention are directed to generating a 3D model of the object that excludes the user's hand.

Detecting Hands

In some embodiments of the present invention, object detection techniques, such as hand detection techniques are applied to remove hands from a scene. For example, if a color image is available (such as in the case of an RGB-D camera system), a pre-trained skin-color model can be used to detect skin colored pixels. These pixels can then be grouped into adjacent blocks, and the resulting shapes filtered by size, and possibly shape, to detect the locations of the hands, which can be removed from the depth images (e.g., can be left as holes in the point clouds).

In other embodiments of the present invention, machine learning techniques are used to train a hand model on shape descriptions, color, or other image features such as a histogram of gradients or template matching techniques. Techniques such as a sliding window or convolutional neural network may be used to identify portions of captured depth frames that contain hands, and remove those portions of the depth frames from the computation of the chunks.

In some embodiments of the present invention, geometric techniques may be applied to detect surfaces that are not part of the target object while the object is being reconfigured. Generally, during object scanning, the object and the surface supporting the object occupy most of the field of view, and the space between the scanning system 100 and the target object will be free of surfaces that would occlude or block the view of the target object. As such, it can be assumed that data points that suddenly appear (e.g., from outside of the field of view) and move toward the object are hands and can be removed from the captured data.

In another embodiment of the present invention, the scanning system 100 includes a user interface control (e.g., a physical button, a touch control, a voice command, a gesture, etc.) to indicate that reconfiguration is occurring, and that captured data should not be added to the current point cloud because the current frames will include images of surfaces that should not appear in the final model. However, embodiments of the present invention may also continue to track the shape and location of the target object and may, in some embodiments, track the transformation of the object during reconfiguration, such that the detected transformation can be applied, automatically, to the previously captured chunks.

In some embodiments of the present invention, the scanning system 100 is integrated into a wearable device, such as a pair of augmented reality (AR) glasses, where the scanning camera faces forward (e.g., in the same direction that the user is looking). In these embodiments, the AR glasses may display a representation of the captured point clouds on the glasses such that the point clouds are superimposed on the user's view of the target object. This leaves both of the user's hands free to manipulate the object when performing the scan. Furthermore, as discussed above, the user may supply user input, such as a rough alignment of the point cloud with a reconfigured target object, using three dimensional gestures that are detected by the scanning system 100 (see, e.g., U.S. Pat. No. 8,836,768 "Method and System Enabling Natural User Interface Gestures with User Wearable Glasses," issued on Sep. 16, 2014, the entire disclosure of which is incorporated by reference.

User Interfaces for Combining Chunks

Reactive Assembly and Chunk Selection

When applying embodiments of the present invention, a complete scan of a target object may include multiple partial scans or chunks. However, it may be difficult for a user to understand how each chunk contributes to the final resulting model. In addition, some chunks may be have artifacts or otherwise be of poor quality, and may need to be removed from the final model (e.g., replaced with higher quality chunks). Furthermore, the sum of the captured chunks may still leave holes or missing areas. As such, aspects of embodiments of the present invention relate to a user interface for interacting with and manipulating captured chunks of an object.

Figure 11:
FIG. 11 is a depiction of a user interface for managing chunks according to one embodiment of the present invention.
Figure 12:
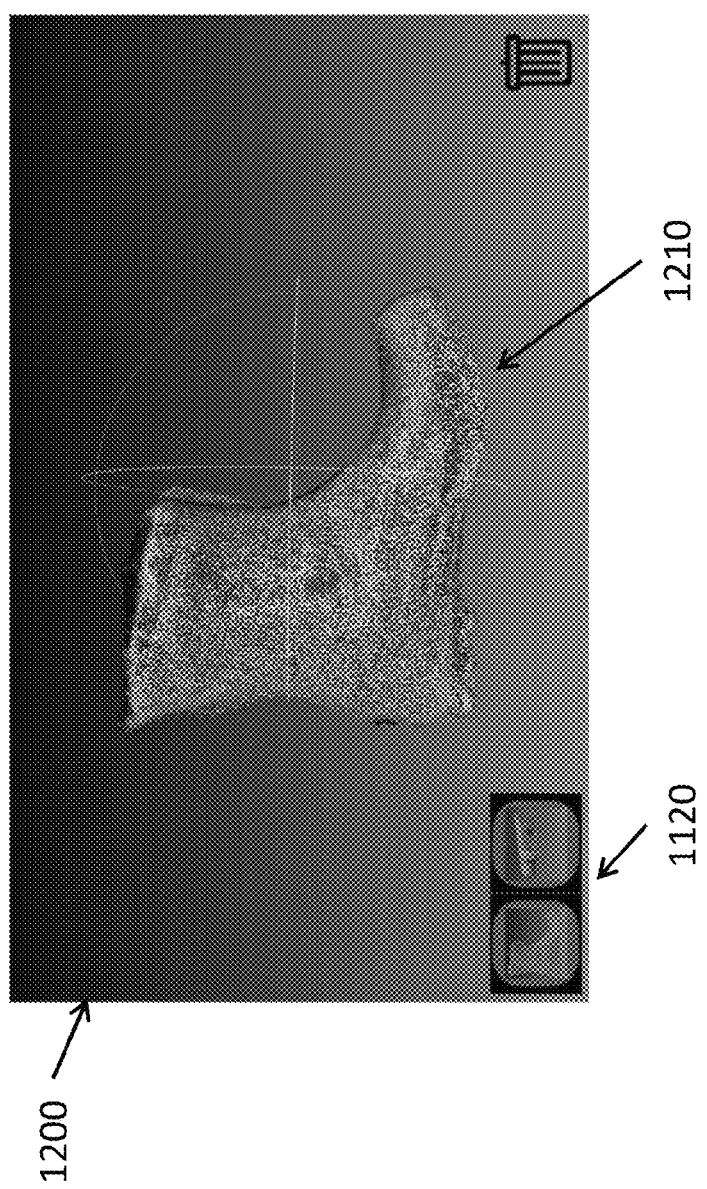
FIG. 12 is a depiction of a user interface according to one embodiment of the present invention for displaying a preview of assembling a subset of a plurality of chunks of an object.

FIG. 11 is a depiction of a user interface for managing chunks according to one embodiment of the present invention. As shown in FIG. 11, one part of the user interface, called a chunk drawer 1120, displays a snapshot of every chunk after it is captured. When the user is ready to examine the chunk assembly results, the assembled complete model (or chunk assembly) is displayed in a canvas 1200, as shown in FIG. 12. This canvas is reactive to the contents of the chunk drawer. When the user removes a chunk from this drawer (such as by dragging and dropping it into a trashcan icon), the preview 1210 updates with the result of a chunk assembly that is assembled using only the remaining chunks in the drawer. The user can experiment by adding and removing chunks from the drawer and choosing the best set of chunks to obtain the desired result. In some embodiments of the present invention, rather than adding and removing chunks from the chunk drawer, the preview 1210 is assembled from a subset of chunks that the user has selected from the chunk drawer. By changing the set of selected chunks, the user can quickly identify the effect of adding or removing any given chunk from the chunk assembly. The confidence of assembling any pair of chunks (e.g., as represented by the registration cost computed during the registration process) may also be displayed on the screen.

Each chunk may be displayed in chunk assembly in a different color, thereby making it easy for the user to identify which portions of the assembled model came from which chunks. The separate chunks may be shown in corresponding colors in the chunk drawer. For example, a first chunk may be displayed in blue both in the chunk drawer and in the preview 1210, and a second chunk may be displayed in red in both the chunk drawer and in the preview 1210, where it is assembled with the blue first chunk. As such, points in the chunk assembly of the first chunk and second chunk may be colored in accordance with whether the points originated from the first chunk or the second chunk, which may assist the user in identifying which chunks may be of lower quality or which chunks may be causing unintended artifacts to appear in the chunk assembly.

As described above, in some instances, the chunks may be too large to be stored, in their entirety, in memory 110. Therefore the full size (or high resolution) chunks may be stored in persistent memory 120, and the processes for manipulating and assembling chunks is performed on reduced size (or decimated or low resolution) versions of the chunks that can be stored in memory 110. Decimating the chunks in this way may also improve the speed of registration of chunks due to the smaller data sets, but may, in some instances, reduce the accuracy of the result.

Once the user has selected a set of chunks to merge based on experiments with combining the decimated chunks, the user can request a final, higher resolution model to be generated using the full size chunks. The rigid transformations (e.g., rotations and translations) applied to align the decimated chunks may then also be applied to the full sized chunks (possibly with further refinement of the alignment based on a local alignment process performed on the high resolution chunks) to generate a final model of the target object.

Chunk Merging Interface

Figure 13A:
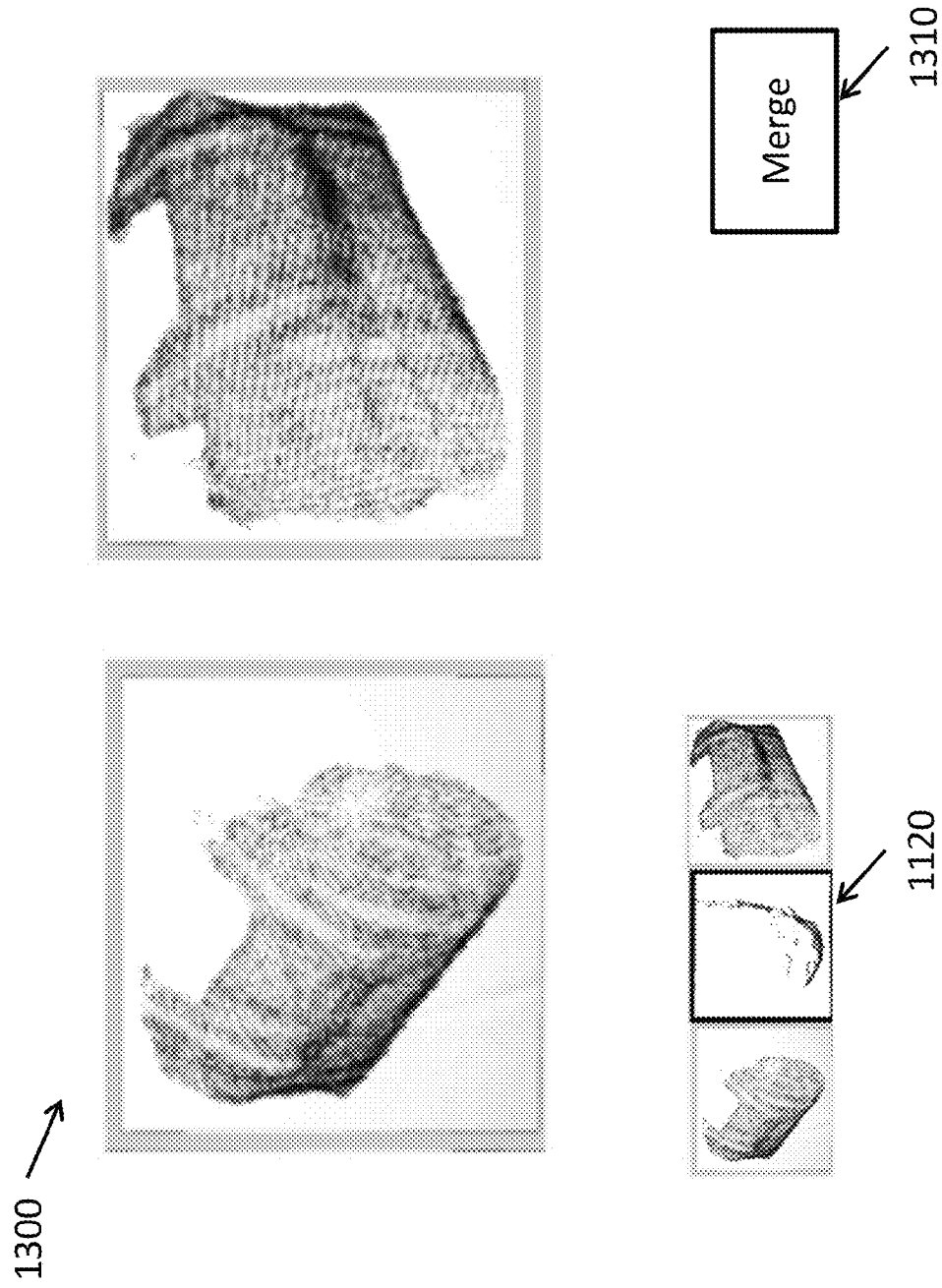
FIGS. 13A and 13B are depictions of a user interface according to one embodiment of the present invention for displaying a plurality of chunks in a chunk drawer and for adding an assembly of chunks to the chunk drawer.
Figure 13B:
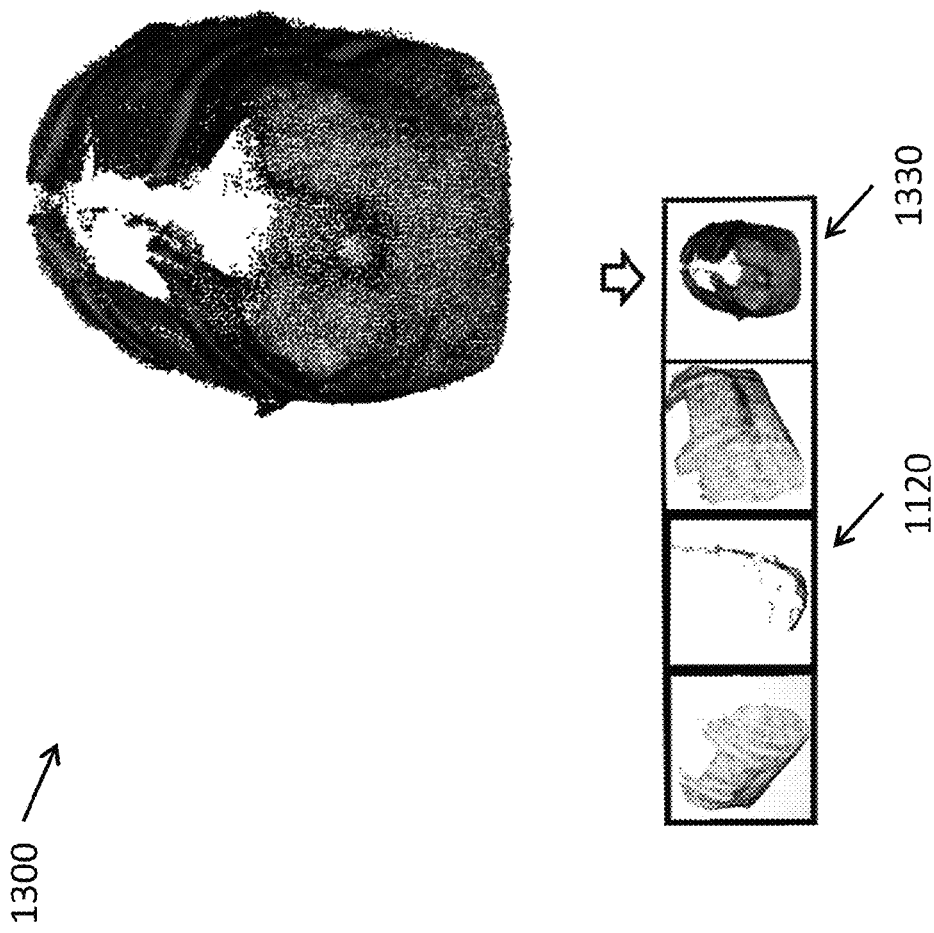

Aspects of embodiments of the present invention are also directed to user interfaces for merging chunks. Chunks can be individually merged to create a full scan, or a new, more complete, chunk for the user to build upon. As shown in FIG. 13A, in one embodiment, a chunk merging user interface displays a main canvas 1300, along with a snapshot of the current scanned chunks. The user can then select multiple chunks and press a merge button 1310 to create the new chunk. The canvas 1300 would then update with the merged point cloud. In some embodiments, this merged result is then added as a new chunk 1330 in the chunk drawer 1120, as shown in FIG. 13B.

As such, a chunk merging interface according to embodiments of the present invention enables the user to take multiple scans of areas of an object and to experiment with which chunks merge best to create the complete model of the object, and then finalize a decision regarding the best chunks. Another advantage of this interface is that the order in which chunks are merged can affect the overall outcome, and giving the user this ability to experiment with merging chunks in various orders can help to create a more accurate final model. For example, a first chunk may have only a small overlap with a second chunk and a small overlap with a third chunk and it may be difficult to accurately align the first chunk with either the second or third chunk. However, if the second and third chunk are combined first, the overlap between the first chunk and the combined second and third chunks may be large enough to enable accurate alignment.

Versioning and Rollback

Another aspect of a user interface according to embodiments of the present invention relates to versioning scans. Because a complete scan is a combination of several chunks, the chunks may be collected together as a scanning project that includes metadata. Each chunk may be associated with a corresponding timestamp identifying when the chunk was captured or when the chunk was added to a scanning project. This enables the user to track the progress of a scan chronologically. For complex objects needing multiple scans, these timestamps provide information about the progress of scanning, how different chunks contribute to the final model, and the capability to add or remove chunks at any time, even if they are captured several days apart, which can help in evaluating the quality of any particular scan and its contribution to any final model.

Versioning also enables the rollback of changes that are undesirable. Instead of storing the model as one monolithic block (e.g., a single point cloud), in some embodiments, the model is stored as its constituent chunks (or containing the constituent chunks along with the finalized model). As such, embodiments of the present invention can store the roll-back or remove undesired chunks, or even selectively replace bad chunks by scanning only those parts again without the need to scan the entire object all over again. Any particular version of the model may be represented using metadata that identifies a collection of chunks (or identifiers of chunks) that are included in that particular version of the model, along with the transformations applied to each of those chunks, and, in some embodiments, the order in which the chunks are combined.

Collaboration

Aspects of embodiments of the present invention are directed to user interfaces for collaboration in performing scans. Because embodiments of the present invention allow assembly of chunks captured during separate scans to construct a complete three dimensional model of an object, it is possible to merge chunks received from a remote source, which may include chunks captured by different users scanning the same object (or substantially the same object). In one embodiment of the present invention, users can share their scans (including the constituent chunks), such as by transmitting their scans to one another over a network (e.g., as an email attachment) or saving their scans onto a server (e.g., a cloud storage provider). Users who scan the same object (or substantially the same object, such as a mass produced object having a consistent appearance) could generate a model and replace a bad chunk in their scan with a better chunk received from a remote source (e.g., captured by another user). In addition, multiple users can contribute chunks to a project to construct the full model, thereby saving time, as the users can capture scans in parallel. For example, multiple users may stand on different sides of the same large object and perform scans from their respective viewpoints. The resulting chunks from their separate scans can then be combined to generate a model of the entire object.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for computing a three-dimensional (3D) model of an object, the method comprising:
   receiving, by a processor, a first chunk comprising a 3D model of a first portion of the object, the first chunk being generated from a plurality of depth images of the first portion of the object;
   receiving, by the processor, a second chunk comprising a 3D model of a second portion the object, the second chunk being generated from a plurality of depth images of the second portion of the object;
   computing, by the processor, a registration of the first chunk with the second chunk, the registration corresponding to a transformation aligning corresponding portions of the first and second chunks, the computing the registration of the first chunk with the second chunk comprising:
   extracting, by the processor, first key points from color textures of a first surface of the first chunk;
   extracting, by the processor, second key points from color textures of a second surface of the second chunk; and
   computing a rigid transformation from the second key points to the first key points;
   aligning, by the processor, the first chunk with the second chunk in accordance with the registration; and
   outputting, by the processor, a 3D model corresponding to the first chunk merged with the second chunk.

2. The method of claim 1, wherein the computing the registration of the first chunk with the second chunk comprises:
   computing a first cuboid bounding box of the first chunk;
   computing a second cuboid bounding box of the second chunk;
   finding a plurality of rigid transformations of the first cuboid onto the second cuboid;
   computing a plurality of registration costs, each of the registration costs corresponding to one of the rigid transformations; and
   selecting a rigid transformation of the rigid transformations in accordance with the registration costs, the registration comprising the rigid transformation of the rigid transformations.

3. The method of claim 1, further comprising:
   computing a registration cost of the rigid transformation;
   modifying the registration cost in accordance with inconsistency between matching points of the first chunk and the second chunk; and
   computing the registration in accordance with a rigid transformation having a minimized registration cost.

4. A method for computing a three-dimensional (3D) model of an object, the method comprising:
   receiving, by a processor, a first chunk comprising a 3D model of a first portion of the object, the first chunk being generated from a plurality of depth images of the first portion of the object;
   receiving, by the processor, a second chunk comprising a 3D model of a second portion the object, the second chunk being generated from a plurality of depth images of the second portion of the object;
   computing, by the processor, a registration of the first chunk with the second chunk, the registration corresponding to a transformation aligning corresponding portions of the first and second chunks, the computing the registration of the first chunk with the second chunk comprising:
   extracting, by the processor, first key points from color textures of a first surface of the first chunk;
   extracting, by the processor, second key points from color textures of a second surface of the second chunk; and
   computing a rigid transformation from the second key points to the first key points;
   aligning, by the processor, the first chunk with the second chunk in accordance with the registration; and
   outputting, by the processor, a 3D model corresponding to the first chunk merged with the second chunk,
   wherein the computing the registration of the first chunk with the second chunk further comprises:

receiving a user supplied transformation of the first chunk, the user supplied transformation comprising at least one transformation of the group comprising:
a rotation;
a translation; and
a zoom; and
applying the user supplied transformation to the first chunk.

5. The method of claim 4, wherein the computing the registration of the first chunk with the second chunk further comprises:
computing a first cuboid bounding box of the first chunk;
computing a second cuboid bounding box of the second chunk;
identifying three vertices of the first chunk;
transforming the three vertices of the first cuboid in accordance with the user supplied transformation;
identifying the three vertices of the second cuboid corresponding to the transformed three vertices of the first cuboid;
computing a vertex transformation of the three vertices of the first cuboid to the three corresponding vertices of the second cuboid;
initializing the transformation aligning corresponding portions of the first and second chunks in accordance with the user supplied transformation and the vertex transformation; and
refining the transformation aligning corresponding portions of the first and second chunks in accordance with a local registration method.

6. The method of claim 1, wherein the aligning the first chunk with the second chunk in accordance with the registration comprises:
transforming the first chunk in accordance with the registration;
combining matching points between the first chunk and the second chunk; and
adding unique points from the first chunk and the second chunk.

7. The method of claim 1, wherein the method further comprises:
when the registration of the first chunk with the second chunk fails:
receiving an additional depth frame corresponding to the second chunk;
updating the 3D model of the second chunk in accordance with the additional depth frame to compute an updated second chunk; and
computing the registration of the first chunk with the updated second chunk.

8. The method of claim 1, wherein the 3D model of the first portion of the object corresponds to the object in a first configuration, and the 3D model of the second portion of the object corresponds to the object in a second configuration.

9. A method for computing a three-dimensional (3D) model of an object, the method comprising:
receiving, by a processor, a first chunk comprising a 3D model of a first portion of the object, the first chunk being generated from a plurality of depth images of the first portion of the object;
receiving, by the processor, a second chunk comprising a 3D model of a second portion the object, the second chunk being generated from a plurality of depth images of the second portion of the object;
computing, by the processor, a registration of the first chunk with the second chunk, the registration corresponding to a transformation aligning corresponding portions of the first and second chunks;
aligning, by the processor, the first chunk with the second chunk in accordance with the registration;
outputting, by the processor, a 3D model corresponding to the first chunk merged with the second chunk;
detecting portions of the depth images of the second portion of the object corresponding to human hands;
removing the portions of the depth images corresponding to the human hands; and
generating the second chunk from the depth images with the portions corresponding to human hands removed from the depth images.

10. A system for generating a three-dimensional (3D) scan of an object, the system comprising:
a depth camera system comprising a sensor;
a display device;
a processor coupled to depth camera system and the display device; and
memory storing instructions that, when executed by the processor, cause the processor to:
control the depth camera system to capture a first plurality of depth images;
compute a first chunk comprising a 3D model of a first portion of the object generated from the first plurality of depth images;
control the depth camera system to capture a second plurality of depth images;
compute a second chunk comprising a 3D model of a second portion of the object generated from the second plurality of depth images;
compute a registration of the first chunk with the second chunk, the registration corresponding to a transformation aligning corresponding portions of the first and second chunks by:
extracting, by the processor, first key points from color textures of a first surface of the first chunk;
extracting, by the processor, second key points from color textures of a second surface of the second chunk; and
computing a rigid transformation from the second key points to the first key points;
align the first chunk with the second chunk in accordance with the registration; and
display, on the display device, a 3D model corresponding to the first chunk merged with the second chunk.

11. The system of claim 10, wherein the memory further stores instructions that, when executed by the processor, cause the processor to compute the registration of the first chunk with the second chunk by:
computing, by the processor, a first cuboid bounding box of the first chunk;
computing, by the processor, a second cuboid bounding box of the second chunk;
finding, by the processor, a plurality of rigid transformations of the first cuboid onto the second cuboid;
computing, by the processor, a plurality of registration costs, each of the registration costs corresponding to one of the rigid transformations; and
selecting, by the processor, a rigid transformation of the rigid transformations in accordance with the registration costs, the registration comprising the rigid transformation of the rigid transformations.

12. The system of claim 10, wherein the memory further stores instructions that, when executed by the processor, cause the processor to compute the registration of the first chunk with the second chunk by:

computing a registration cost of the rigid transformation;
modifying the registration cost in accordance with inconsistency between matching points of the first chunk and the second chunk; and
computing the registration in accordance with a rigid transformation having a minimized registration cost.

13. A system for generating a three-dimensional (3D) scan of an object, the system comprising:
a depth camera system comprising a sensor;
a display device;
a processor coupled to depth camera system and the display device; and
memory storing instructions that, when executed by the processor, cause the processor to:
control the depth camera system to capture a first plurality of depth images;
compute a first chunk comprising a 3D model of a first portion of the object generated from the first plurality of depth images;
control the depth camera system to capture a second plurality of depth images;
compute a second chunk comprising a 3D model of a second portion of the object generated from the second plurality of depth images;
receive a user supplied transformation of the first chunk, the user supplied transformation comprising at least one transformation of the group comprising:
a rotation;
a translation; and
a zoom; and
apply the user supplied transformation to the first chunk;
compute a registration of the first chunk with the second chunk, the registration corresponding to a transformation aligning corresponding portions of the first and second chunks, wherein the instructions to compute the registration of the first chunk with the second chunk comprise instructions that, when executed by the processor, cause the processor to:
extract first key points from color textures of a first surface of the first chunk;
extract second key points from color textures of a second surface of the second chunk; and
compute a rigid transformation from the second key points to the first key points;
align the first chunk with the second chunk in accordance with the registration; and
display, on the display device, a 3D model corresponding to the first chunk merged with the second chunk.

14. The system of claim 13, wherein the display device is a touchscreen, and
wherein the user supplied transformation is received via a touch input supplied to the touchscreen.

15. The system of claim 13, wherein the user supplied transformation is detected as a three dimensional gesture detected by the depth camera system.

16. The system of claim 13, wherein the memory further stores instructions that, when executed by the processor, cause the processor to compute the registration of the first chunk with the second chunk by:
computing a first cuboid bounding box of the first chunk;
computing a second cuboid bounding box of the second chunk;
identifying three vertices of the first chunk;
transforming the three vertices of the first cuboid in accordance with the user supplied transformation;
identifying the three vertices of the second cuboid corresponding to the transformed three vertices of the first cuboid;
computing a vertex transformation of the three vertices of the first cuboid to the three corresponding vertices of the second cuboid;
initializing the transformation aligning corresponding portions of the first and second chunks in accordance with the user supplied transformation and the vertex transformation; and
refining the transformation aligning corresponding portions of the first and second chunks in accordance with a local registration method.

17. The system of claim 10, wherein the memory further stores instructions that, when executed by the processor, cause the processor to align the first chunk with the second chunk by:
transforming the first chunk in accordance with the registration;
combining matching points between the first chunk and the second chunk; and
adding unique points from the first chunk and the second chunk.

18. The system of claim 10, wherein the memory further stores instructions that, when executed by the processor, cause the processor to, when the registration of the first chunk with the second chunk fails:
receive an additional depth frame corresponding to the second chunk;
update the 3D model of the second chunk in accordance with the additional depth frame to compute an updated second chunk; and
compute the registration of the first chunk with the updated second chunk.

19. The system of claim 10, wherein the 3D model of the first portion of the object corresponds to the object in a first configuration, and the 3D model of the second portion of the object corresponds to the object in a second configuration.

20. A system for generating a three-dimensional (3D) scan of an object, the system comprising:
a depth camera system comprising a sensor;
a display device;
a processor coupled to depth camera system and the display device; and
memory storing instructions that, when executed by the processor, cause the processor to:
control the depth camera system to capture a first plurality of depth images;
compute a first chunk comprising a 3D model of a first portion of the object generated from the first plurality of depth images;
control the depth camera system to capture a second plurality of depth images;
compute a second chunk comprising a 3D model of a second portion of the object generated from the second plurality of depth images;
compute a registration of the first chunk with the second chunk, the registration corresponding to a transformation aligning corresponding portions of the first and second chunks;
align the first chunk with the second chunk in accordance with the registration;
display, on the display device, a 3D model corresponding to the first chunk merged with the second chunk
detect portions of the depth images of the second portion of the object corresponding to human hands;

remove the portions of the depth images corresponding to the human hands; and generate the second chunk from the depth images with the portions corresponding to human hands removed from the depth images.

21. The system of claim 10, wherein the display device is integrated into a pair of augmented reality glasses.

22. The system of claim 21, wherein the depth camera system is integrated into the pair of augmented reality glasses.

23. A method for assembling a plurality of chunks corresponding to separate three-dimensional (3D) models of different portions of an object, the chunks being displayed in a graphical user interface, the method comprising:

receiving, by a processor, a selection of a first chunk of the plurality of chunks, the first chunk comprising a 3D model of a first portion of the object;

receiving, by the processor, a selection of a second chunk of the plurality of chunks, the second chunk comprising a 3D model of a second portion of the object;

computing, by the processor, a registration of the first chunk with the second chunk, the registration corresponding to a transformation aligning corresponding portions of the first and second chunks, the computing the registration of the first chunk with the second chunk comprising:

extracting, by the processor, first key points from color textures of a first surface of the first chunk;

extracting, by the processor, second key points from color textures of a second surface of the second chunk; and computing a rigid transformation from the second key points to the first key points;

aligning, by the processor, the first chunk with the second chunk in accordance with the registration; and displaying, by the processor, the first chunk assembled with the second chunk as a chunk assembly.

24. The method of claim 23, further comprising:

receiving user input to transform a view of the chunk assembly, the user input comprising at least one transformation of the group comprising:

a rotation;

a translation; and a zoom.

25. The method of claim 23, further comprising:

receiving a user input to transform the first chunk, the user input comprising at least one transformation of the group comprising a rotation and a translation; and updating the displaying of the first chunk in accordance with the user input.

26. The method of claim 23, further comprising displaying a confidence of the chunk assembly.

27. The method of claim 23, wherein points in the chunk assembly are colored in accordance with whether the points originated from the first chunk or the second chunk.

28. The method of claim 23, wherein the plurality of chunks are associated with a scanning project, the scanning project comprising one or more versions of assemblies of one or more chunks, each version being associated with metadata storing a collection of chunks that are included an assembly associated with the version.

29. The method of claim 23, wherein at least one chunk of the plurality of chunks is received from a remote source.

* * * * *